US012577058B2

(12) United States Patent (10) Patent No.: US 12,577,058 B2
Randolph (45) Date of Patent: Mar. 17, 2026

(54) SPACING AND CLASSIFICATION CONVEYORS AND RELATED SYSTEMS AND METHODS

(71) Applicant: Marble, Inc., Cambridge, MA (US)

(72) Inventor: Tyler Randolph, Edgefield, SC (US)

(73) Assignee: MARBLE, INC., Cambridge, MA (US)

( * ) Notice: Subject to any disclaimer, the term of this patent is extended or adjusted under 35 U.S.C. 154(b) by 216 days.

(21) Appl. No.: 18/449,674

(22) Filed: Aug. 14, 2023

(65) Prior Publication Data

US 2024/0051765 A1     Feb. 15, 2024

Related U.S. Application Data

(60) Provisional application No. 63/397,517, filed on Aug. 12, 2022.

(51) Int. Cl.
| | |
|---|---|
| *B65G 47/31* | (2006.01) |
| *B65G 43/08* | (2006.01) |
| *B65G 43/10* | (2006.01) |

(52) U.S. Cl.
CPC ............. *B65G 43/08* (2013.01); *B65G 43/10* (2013.01); *B65G 47/31* (2013.01); *B65G 2203/0258* (2013.01); *B65G 2203/0291* (2013.01); *B65G 2203/041* (2013.01)

(58) Field of Classification Search
CPC ........................ B65G 43/08; B65G 2203/0233; B65G 43/10; B65G 47/31; B65G 2203/0258; B65G 2203/0291; B65G 2203/041
USPC ....................................................... 198/460.1
See application file for complete search history.

(56) References Cited

U.S. PATENT DOCUMENTS

| | | | |
|---|---|---|---|
| 3,653,918 | A | 4/1972 | Wallace |
| 3,813,922 | A | 6/1974 | Oswald et al. |
| 3,960,000 | A | 6/1976 | Barnett et al. |
| 3,960,001 | A | 6/1976 | Hayes |

(Continued)

FOREIGN PATENT DOCUMENTS

| | | |
|---|---|---|
| BE | 1011345 A3 | 7/1999 |
| CN | 211515240 U | 9/2020 |

(Continued)

OTHER PUBLICATIONS

Australian Meat Processor Corporation, "Development of Naked Primal Cut Recognition Software" , YouTube, https://www.youtube.com/watch?v=n4J92eaXQCg, Published Apr. 12, 2018.

(Continued)

*Primary Examiner* — Gene O Crawford
*Assistant Examiner* — Lester Rushin, III
(74) *Attorney, Agent, or Firm* — Fredrikson & Byron, P.A.

(57) ABSTRACT

Various gapping conveyors and classification conveyors, including combination gapping and classification conveyors along with separate gapping conveyors and classification devices. In some embodiments, the gapping scale conveyor system includes both a gapping conveyor and a multi-zone scale conveyor in the same device and further includes a computing device for controlling the two conveyors. In other embodiments, a gapping conveyor having three conveyor belts is provided, and separately a classification device is provided having a conveyor with a scale and a hood with various sensors therein, including an imaging device.

20 Claims, 30 Drawing Sheets

(56) References Cited

U.S. PATENT DOCUMENTS

| | | |
|---|---|---|
| 6,267,661 B1 | 7/2001 | Melville |
| 6,729,110 B2 | 5/2004 | Sperry et al. |
| 6,932,751 B1 | 8/2005 | Ward et al. |
| 6,971,221 B2 | 12/2005 | Sperry et al. |
| 7,386,968 B2 | 6/2008 | Sperry et al. |
| 7,603,833 B2 | 10/2009 | Koke |
| 8,505,361 B2 | 8/2013 | Miller et al. |
| 8,800,251 B2 | 8/2014 | Brinkman et al. |
| 9,592,983 B2 | 3/2017 | Costanzo et al. |
| 9,796,537 B2 * | 10/2017 | Lang ..................... B65B 51/00 |
| 9,898,001 B2 | 2/2018 | Michalscheck et al. |
| 10,690,534 B2 * | 6/2020 | Ragan .................... G01G 11/12 |
| 10,781,052 B2 * | 9/2020 | Fourney ................. B65G 43/10 |
| 11,080,496 B2 * | 8/2021 | Wagner ................ B65G 1/1378 |
| 11,286,116 B2 * | 3/2022 | Teichrob ................ B65G 15/30 |
| 11,803,958 B1 | 10/2023 | Arkfeld et al. |
| 12,001,183 B2 | 6/2024 | Foltin et al. |
| 12,006,169 B2 * | 6/2024 | Byrne .................... G01G 11/00 |
| 2002/0038753 A1 * | 4/2002 | Ursu ...................... B65G 47/31 198/460.1 |
| 2004/0151364 A1 | 8/2004 | Kenneway et al. |
| 2006/0266005 A1 | 11/2006 | Koke et al. |
| 2007/0017181 A1 | 1/2007 | Jacobsen et al. |
| 2007/0207242 A1 | 9/2007 | Carlsen |
| 2008/0036139 A1 | 2/2008 | Reyner et al. |
| 2009/0214724 A1 | 8/2009 | Gordon et al. |
| 2014/0079291 A1 | 3/2014 | Johnson |
| 2015/0161170 A1 | 6/2015 | Yee et al. |
| 2016/0027167 A1 | 1/2016 | Johnson |
| 2016/0124742 A1 | 5/2016 | Rangasamy et al. |
| 2017/0174439 A1 | 6/2017 | Ripley |
| 2017/0212028 A1 | 7/2017 | Correia De Matos Nolasco Lamas et al. |
| 2018/0099769 A1 | 4/2018 | Mcdonald et al. |
| 2018/0188108 A1 | 7/2018 | Fawzy |
| 2020/0193587 A1 | 6/2020 | Mairhofer |
| 2020/0207500 A1 | 7/2020 | Kalinowski et al. |
| 2020/0334806 A1 | 10/2020 | Hieda et al. |
| 2021/0015113 A1 | 1/2021 | Aggarwal et al. |
| 2021/0204553 A1 | 7/2021 | Mehta et al. |
| 2021/0321820 A1 | 10/2021 | Hendershot et al. |
| 2021/0383096 A1 | 12/2021 | White et al. |
| 2022/0046292 A1 | 2/2022 | Nair et al. |
| 2022/0129669 A1 | 4/2022 | Devassy et al. |
| 2022/0214243 A1 | 7/2022 | Li et al. |
| 2023/0241776 A1 | 8/2023 | Kuck et al. |
| 2023/0267704 A1 | 8/2023 | Bae et al. |
| 2023/0270126 A1 | 8/2023 | Sreeram |
| 2023/0316481 A1 | 10/2023 | Ngadi et al. |
| 2023/0347386 A1 | 11/2023 | Harris et al. |
| 2024/0370740 A1 | 11/2024 | Haghighat et al. |

FOREIGN PATENT DOCUMENTS

| | | |
|---|---|---|
| EP | 719717 A1 | 7/1996 |
| EP | 1127812 A1 | 8/2001 |
| EP | 1984122 B1 | 9/2014 |
| KR | 1020210157509 A | 12/2021 |
| WO | 9855379 A1 | 12/1998 |
| WO | 2004037652 A1 | 5/2004 |
| WO | 2004045952 A1 | 6/2004 |
| WO | 2018136377 A1 | 7/2018 |
| WO | 2020033635 A1 | 2/2020 |
| WO | 2021237011 A1 | 11/2021 |

OTHER PUBLICATIONS

Australian Meat Processor Corporation, "Final Report Identification of Bagged Racks Using Machine Learning Algorithms", Prepared by MEQ Probe, Published Apr. 12, 2022, pp. 25.

Australian Meat Processor Corporation, "Final Report Identification of Naked Loins Using Machine Learning Algorithms", Prepared by MEQ Probe, Published Mar. 29, 2022, pp. 37.

Australian Meat Processor Corporation, "In plant trial of robotic picking and packing system" Prepared by Strategic Engineering Pty Ltd, Published Nov. 16, 2023, pp. 34.

Australian Meat Processor Corporation, "Integrated Robotic Picking and Packing of Primal Cuts", Prepared by Strategic Engineering Pty Ltd, Published Dec. 7, 2017, pp. 48.

Australian Meat Processor Corporation, "Integrated Robotic Picking and Packing of Primal Cuts", YouTube, https://www.youtube.com/watch?v=_i93fHwshq4, Published Apr. 23, 2018.

Australian Meat Processor Corporation, "Naked Primal Cut Recognition Vision System Trial in Plant", Prepared by Strategic Engineering Pty Ltd, Published Sep. 25, 2020, pp. 37.

Australian Meat Processor Corporation, "Pick and Pack—End Effector Gripper Development", Prepared by Scott Technology, Published Feb. 2016, pp. 26.

ROSEMOUNTCT4215, "Inline Leak Detection for Meat Packaging", Emerson.com/RosemountCT4215, 2022, pp. 2.

American Conveyor Group, SmartPace Dynamic Pacing Conveyor, Feb. 23, 2017, https://web.archive.org/web/20170223184834/https://acgconveyors.com/partners/dorner-smartpace-conveyor/ (Year: 2017).

* cited by examiner

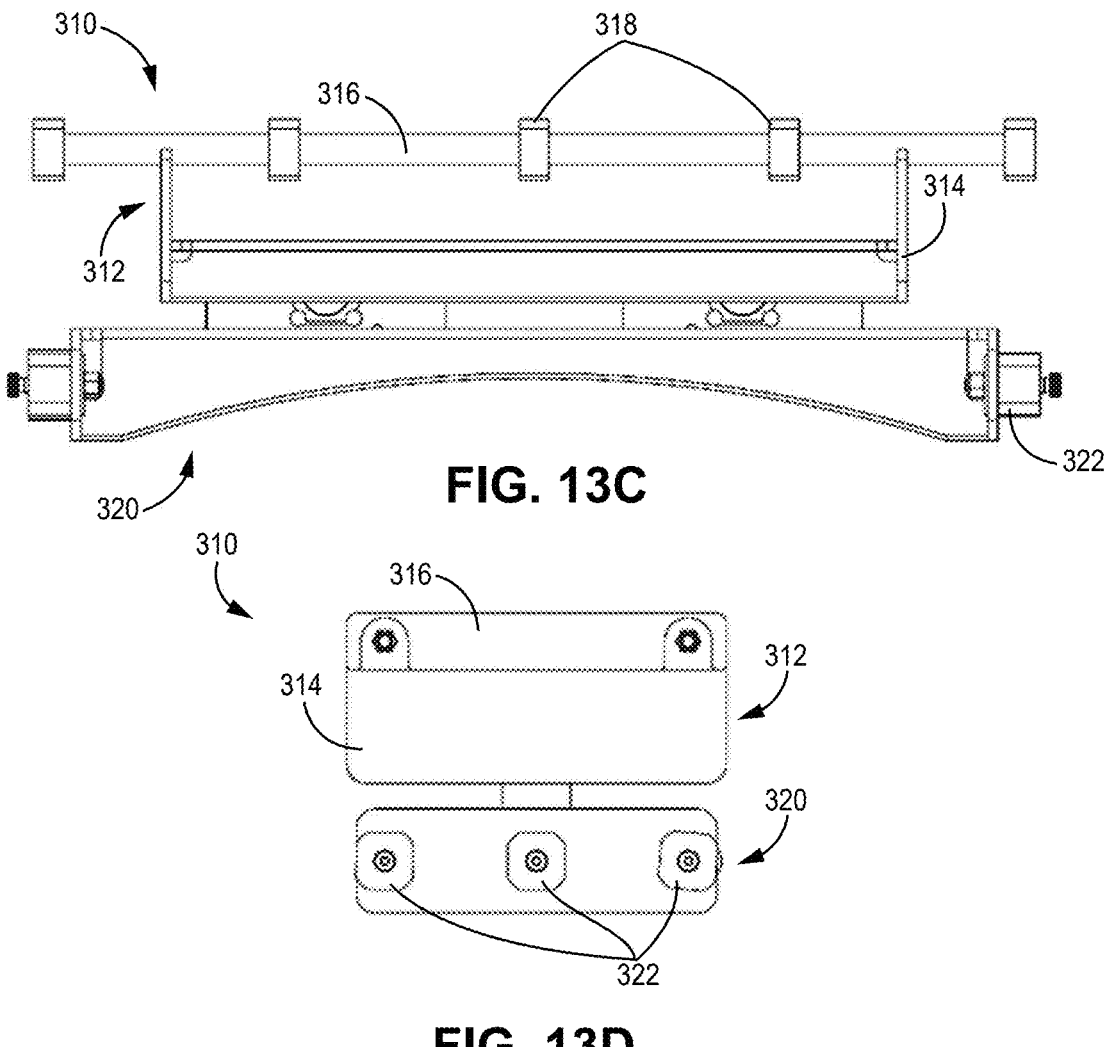
FIG. 13C
FIG. 13D
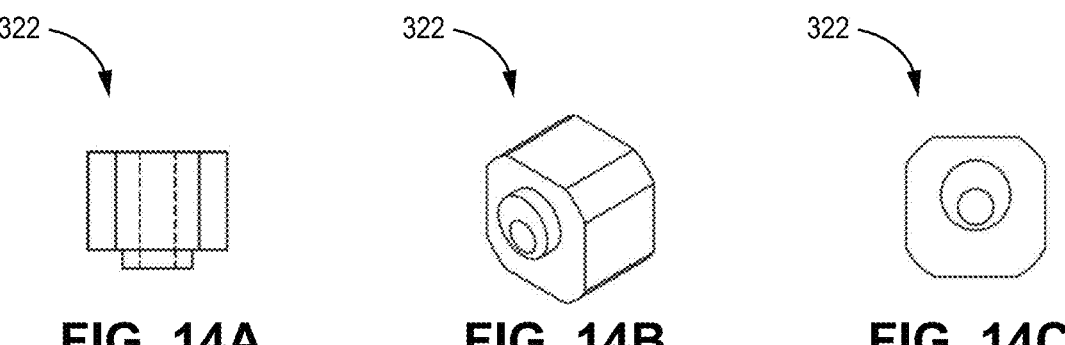
FIG. 14A          FIG. 14B          FIG. 14C

SPACING AND CLASSIFICATION CONVEYORS AND RELATED SYSTEMS AND METHODS

CROSS-REFERENCE TO RELATED APPLICATION(S)

This application claims the benefit under 35 U.S.C. § 119(e) to U.S. Provisional Application 63/397,517, filed Aug. 12, 2022 and entitled "Gapping Scale Conveyor," which is hereby incorporated herein by reference in its entirety.

FIELD

Illustrative embodiments generally relate to processing and, more particularly, various embodiments of the invention relate to separating, weighing, classifying, and moving products, such as meat products.

BACKGROUND

Product processing plants typically process different products, including meat products. These products are typically weighed, sorted into groups, and packaged for transport to stores, restaurants, or end users. Existing separating, weighing, and classifying equipment lacks the automation and the software to accomplish the processing in an efficient manner and with limited human input.

There is a need in the art for improved product separating, weighing, and classifying systems, devices, and methods.

BRIEF SUMMARY

Discussed herein are various spacing conveyors and classification devices for use in various product processing systems. The spacing conveyers can be separate devices that use three conveyor sections to establish a desired gap between the products thereon. The classification devices can be separate devices that have a scale conveyor and a hood disposed over the conveyor with various sensors therein, including an imaging component. Other systems have a combined gapping conveyor and a scale conveyor that can also have an imaging device.

In Example 1, a gapping in-motion scale conveyor system for a plurality of products comprises a gapping conveyor, a multi-zone scale conveyor, and a control system configured to selectively activate the gapping conveyor to move the plurality of products, in series, toward the scale conveyor, wherein the control system is configured to move the plurality of products onto the scale conveyor to form substantially the same gap between each of the products in a series of three or more products traversing the scale conveyor.

Example 2 relates to the gapping scale conveyor system according to Example 1, wherein the scale conveyor includes a plurality of scale zones that can be virtually combined to achieve a plurality of virtual scales lengths that can be dynamically changed from product to the next product in real time.

Example 3 relates to the gapping scale conveyor system according to Example 1, wherein the control system is configured to receive a set of measurements from the plurality of scales corresponding to an instant where a first product and a second product are traveling through the plurality of scale zones.

Example 4 relates to the gapping scale conveyor system according to Example 1, wherein the control system is configured to determine a weight of the first product using the set of measurements.

Example 5 relates to the gapping scale conveyor system according to Example 1, wherein the control system is configured to separate a plurality of products by selectively activating the gapping conveyor or controlling the speed of the gapping conveyor.

Example 6 relates to the gapping scale conveyor system according to Example 1, wherein the scale conveyor and the gapping conveyor are configured to elevate a plurality of products traveling along a belt of the gapping conveyor and a belt of the scale conveyor.

Example 7 relates to the gapping scale conveyor system according to Example 1, comprising a sensor, wherein the control system is configured to determine a length of a product using the sensor.

Example 8 relates to the gapping scale conveyor system according to Example 1, wherein the control system is configured to determine the location of product relative to each scale zone.

In Example 9, a conveyor system for a plurality of products comprises a gapping conveyor comprising three conveyor sections and a classification device disposed adjacent to and coupled with the gapping conveyor, the classification device comprising a conveyor comprising a scale disposed within the conveyor and a sensor enclosure disposed over the conveyor, the sensor enclosure comprising an imaging device. The system further comprises at least one processor configured to control one or more sensors to capture sensor data regarding the product as the product moves along the gapping conveyor, determine, based at least in part on the sensor data, a position of the product in relation to adjacent products, select, based at least in part on the position of the product, a desired gap between the product and the adjacent products, control the three conveyor sections to create the desired gap between the product and the adjacent products, control one or more sensors and the imaging device to capture sensor data regarding the product as the product moves through the classification, determine, based at least in part on the sensor data, a classification of the product, select, based at least in part on the classification of the product, a desired action relating to the product, and control any component of a corresponding processing system to perform the desired action relating to the product.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

3

Figure 2A:
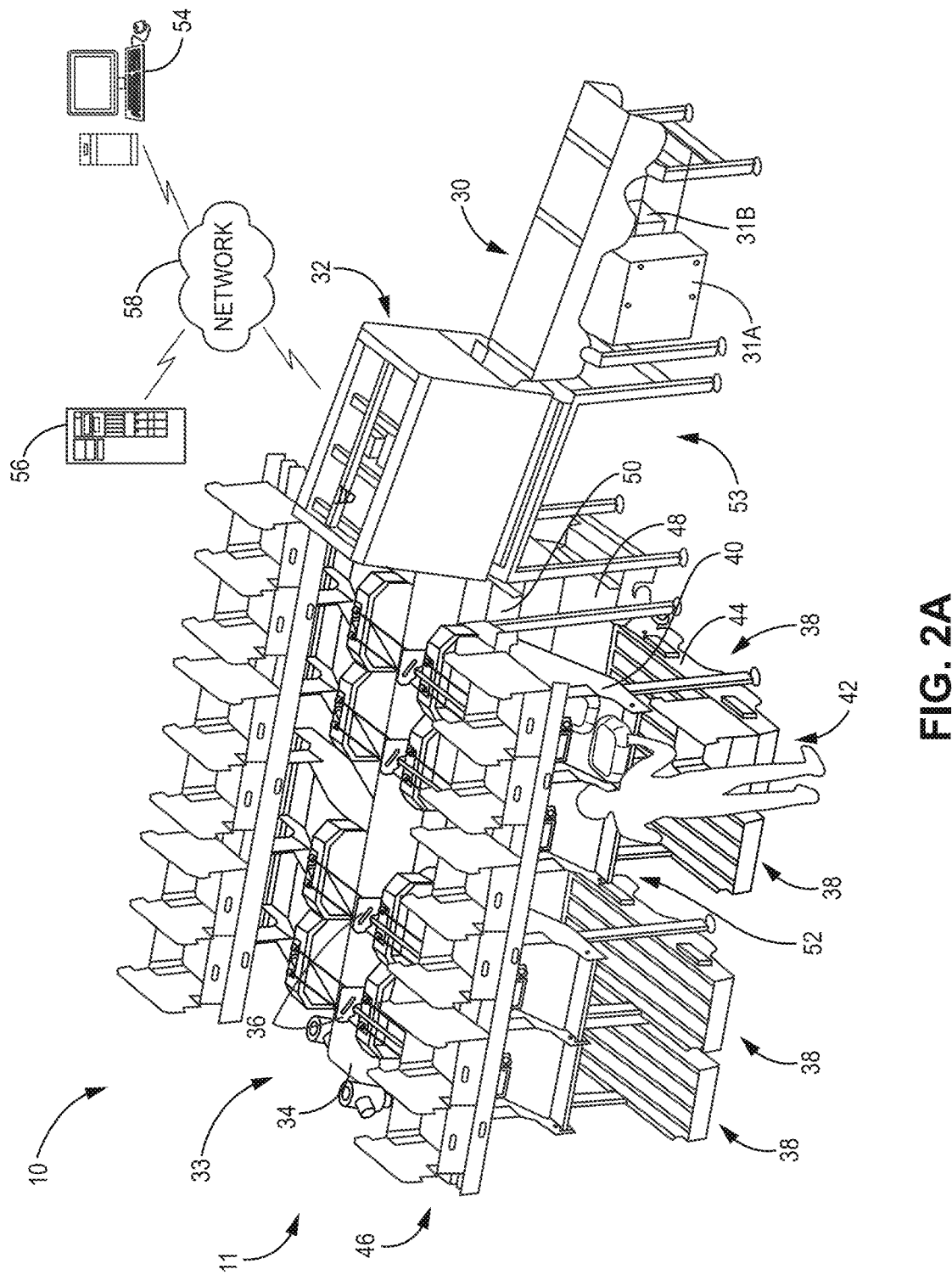
FIG. 2A is a perspective view of a product processing and packing system, according to one embodiment.
Figure 2B:
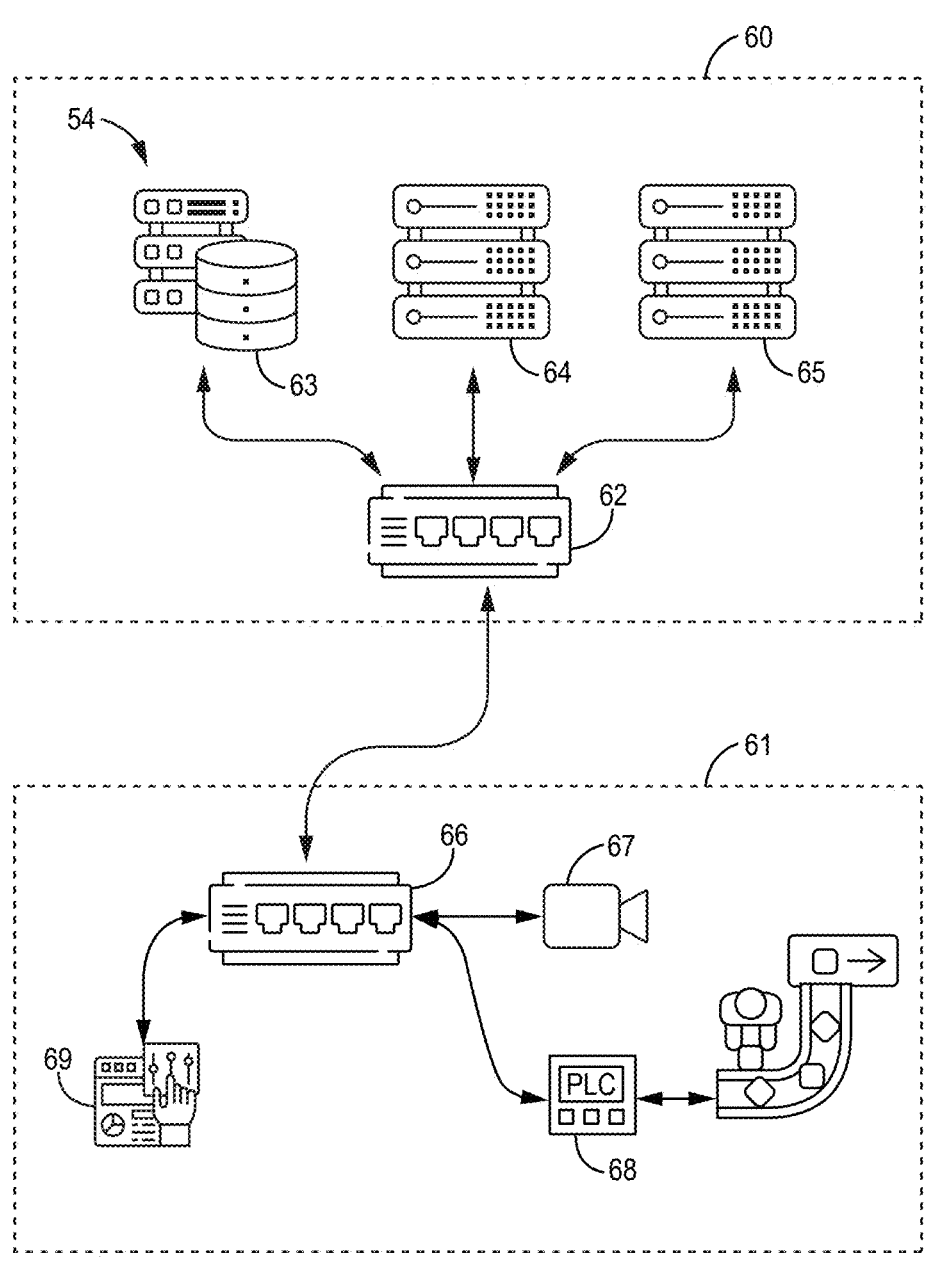
FIG. 2B is a schematic view of a computing device and overall computer architecture of a product processing and packing system, according to one embodiment.
Figure 2C:
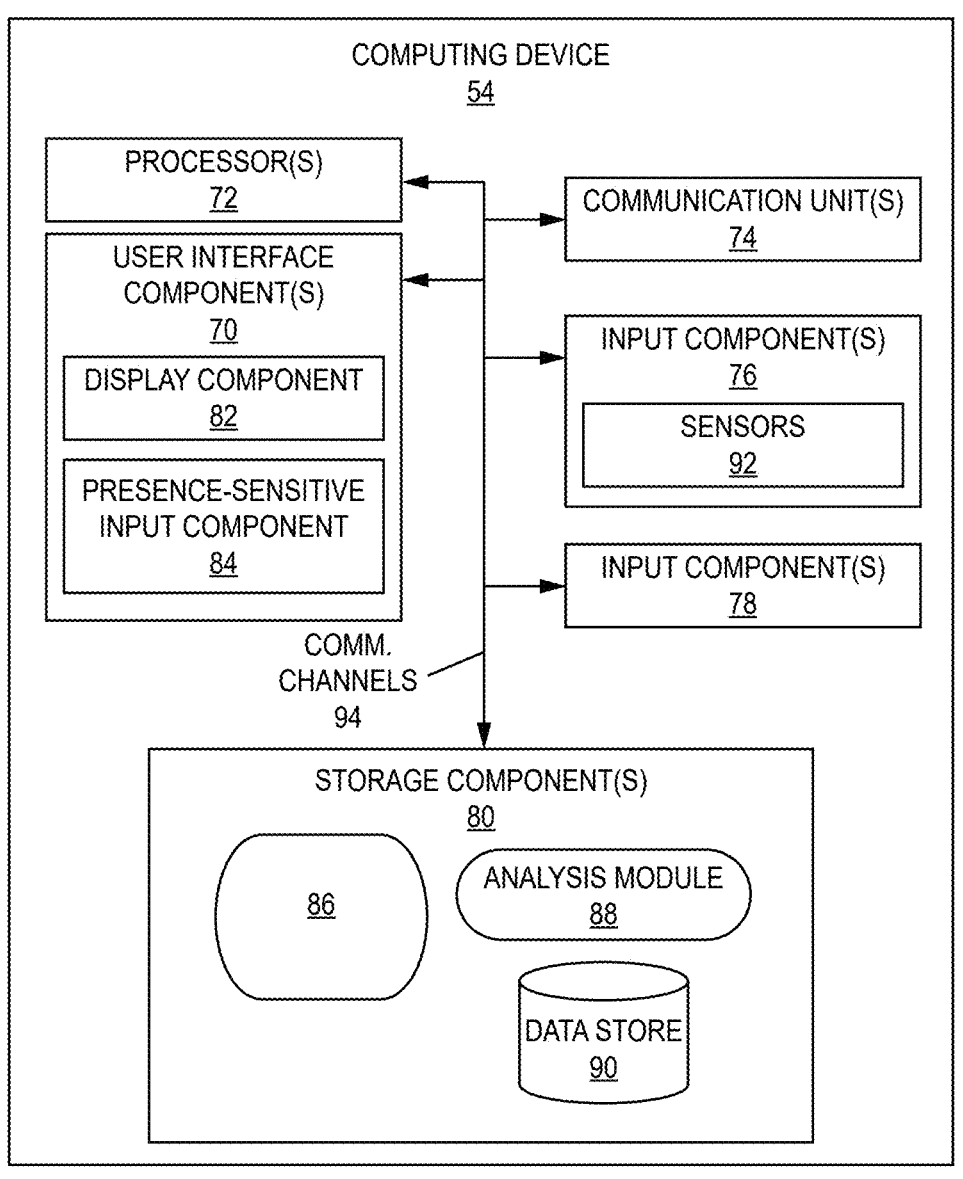

FIG. 2C is a schematic view of another computing device of a product processing and packing system, according to one embodiment.

Figure 3:
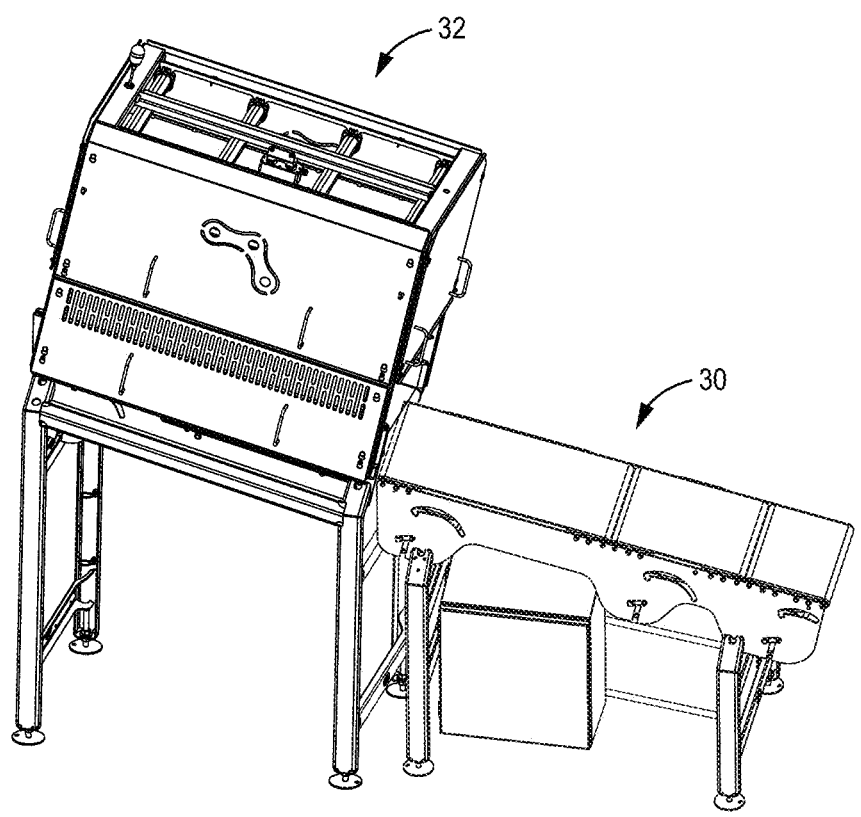

FIG. 3 is a perspective view of a spacing conveyor and a classification device, according to one embodiment.

Figure 4A:
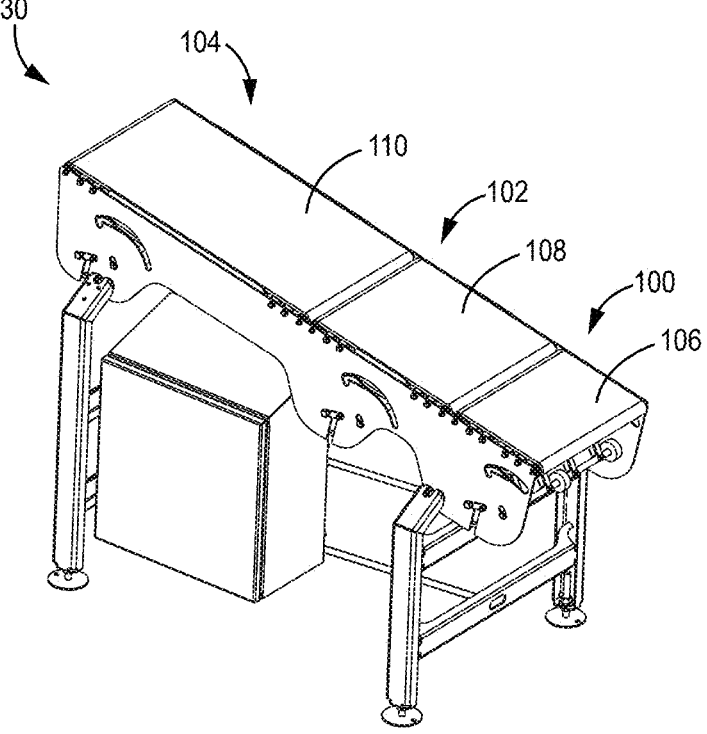

FIG. 4A is a perspective view of a spacing conveyor, according to one embodiment.

Figure 4B:
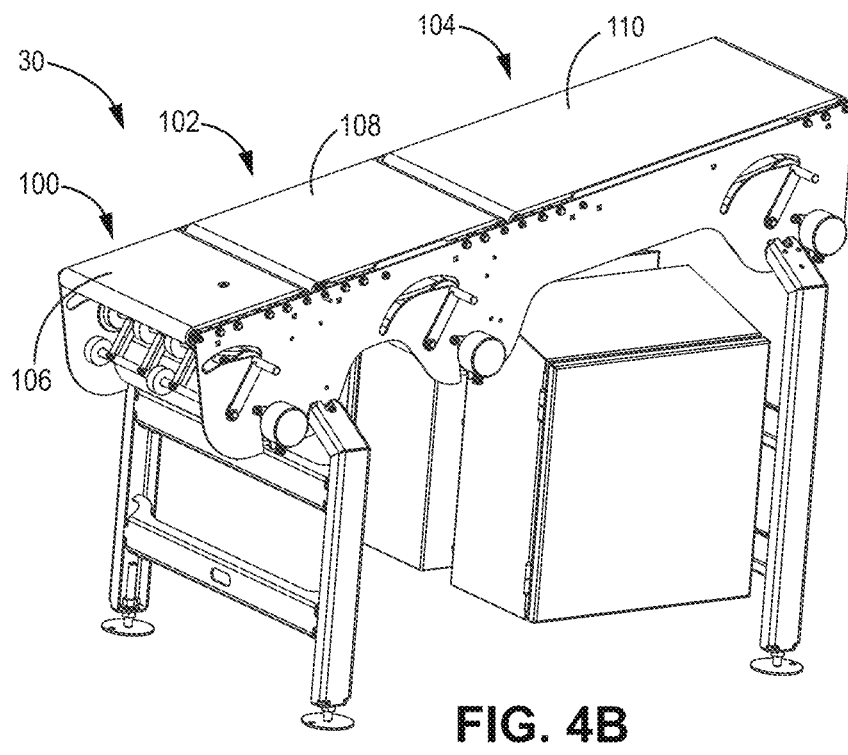

FIG. 4B is another perspective view of the spacing conveyor of FIG. 4A, according to one embodiment.

Figure 4C:
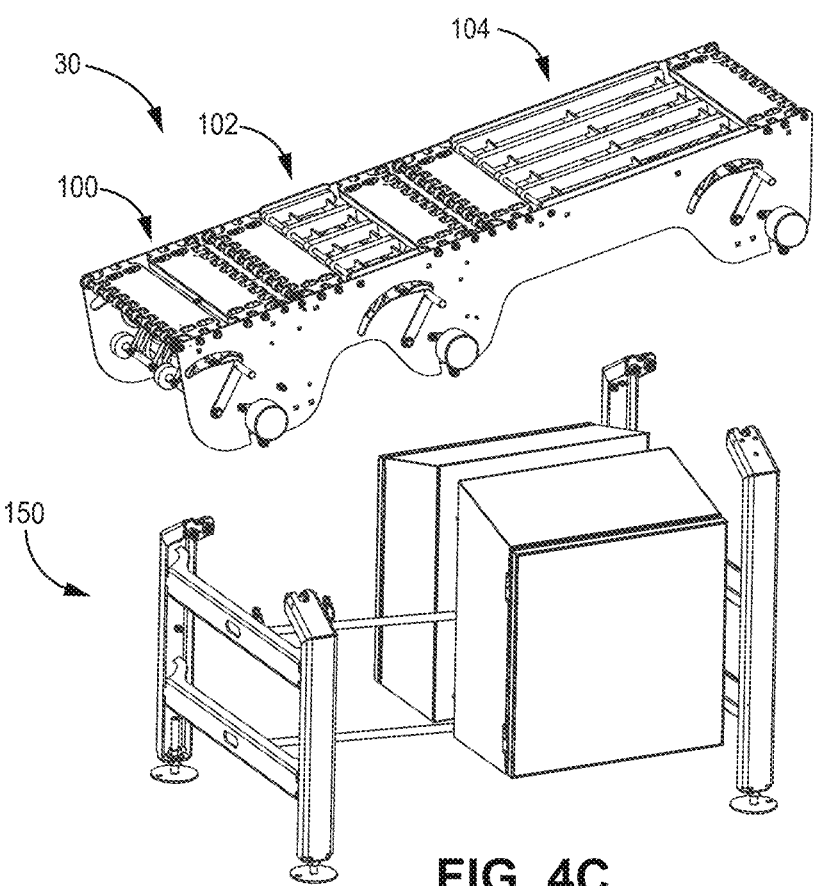

FIG. 4C is an exploded perspective view of the spacing conveyor of FIG. 4A, according to one embodiment.

Figure 4D:
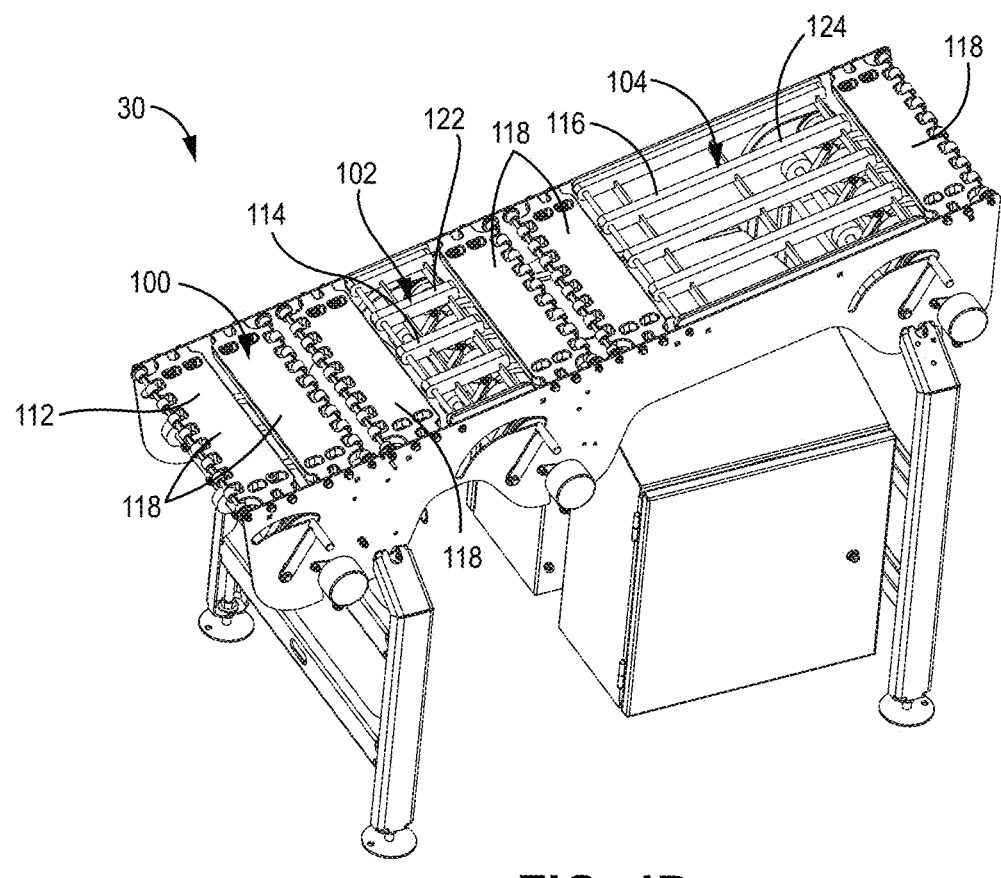

FIG. 4D is an enlarged perspective view of a portion of the spacing conveyor of FIG. 4A, according to one embodiment.

Figure 4E:
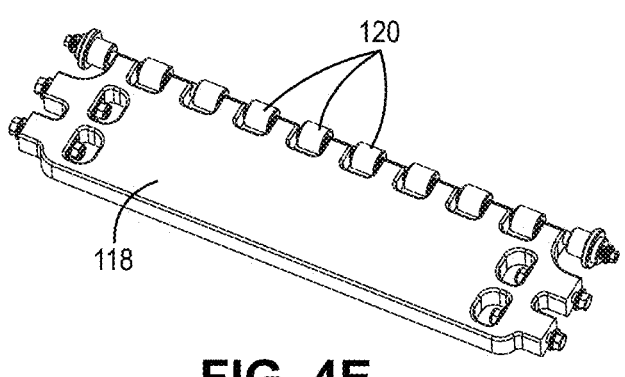

FIG. 4E is a perspective view of a conveyor bed end body, according to one embodiment.

Figure 5A:
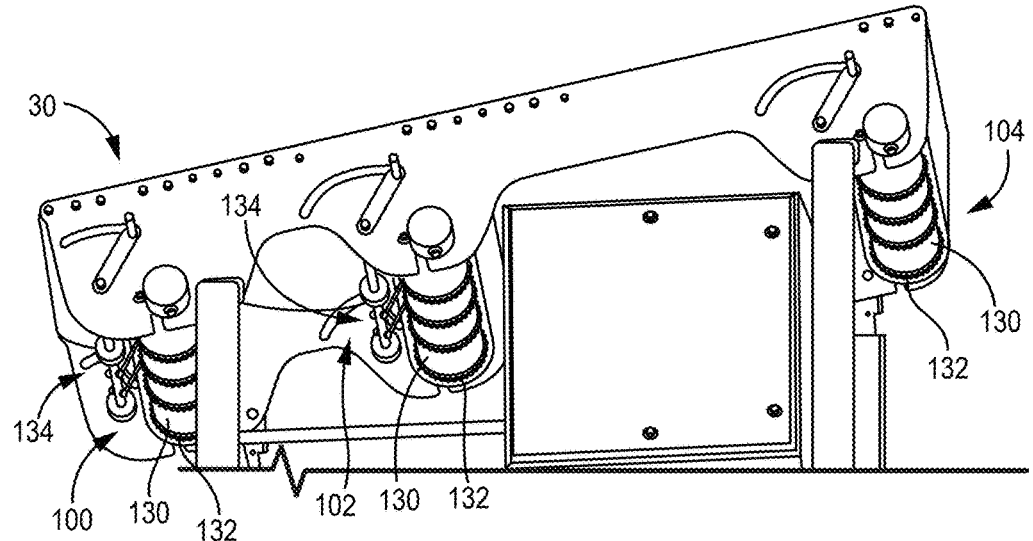

FIG. 5A is a perspective view of the underside of the spacing conveyor of FIG. 4A, according to one embodiment.

Figure 5B:
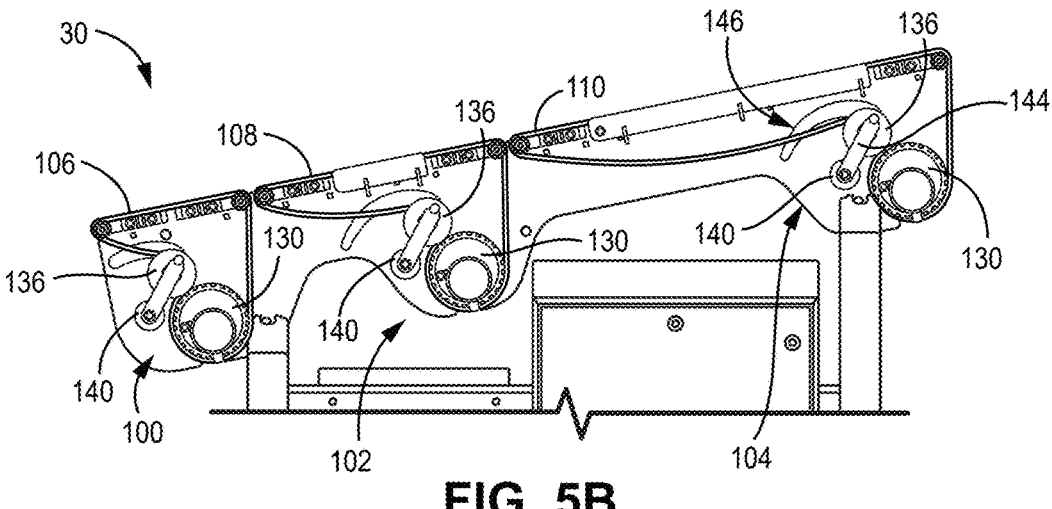

FIG. 5B is a cross-sectional side view of the spacing conveyor of FIG. 4A, according to one embodiment.

Figure 5C:
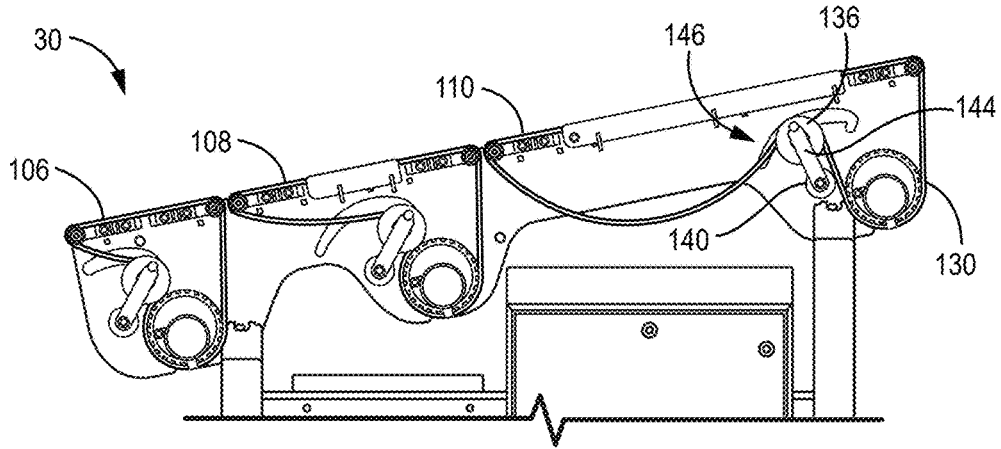

FIG. 5C is another cross-sectional side view of the spacing conveyor of FIG. 4A, according to one embodiment.

Figure 5D:
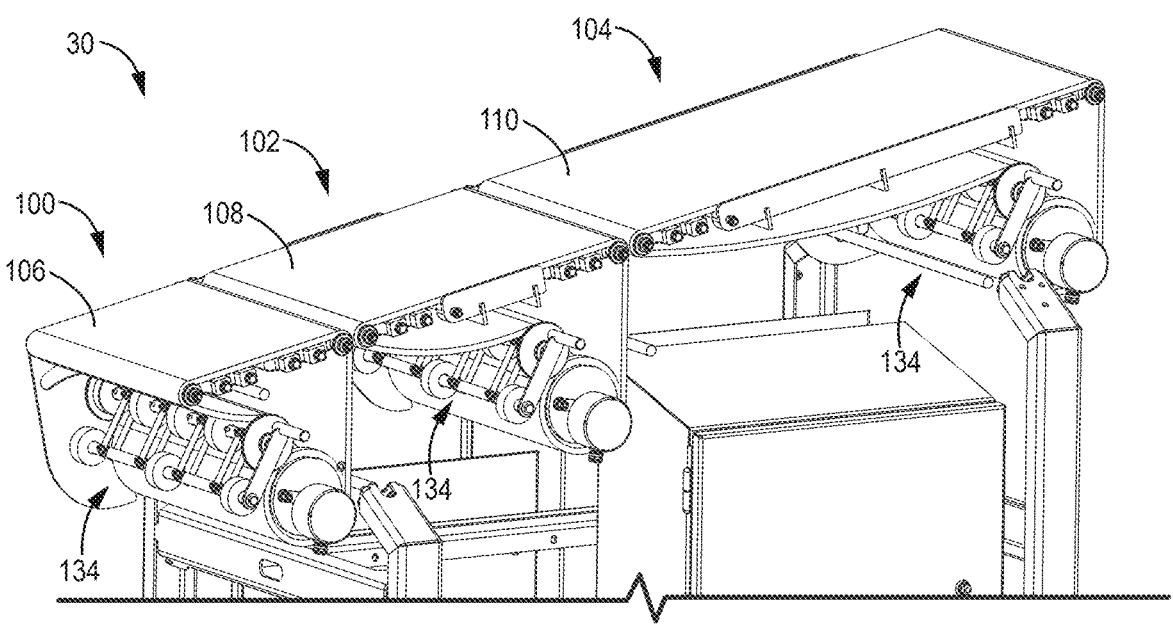

FIG. 5D is a cross-sectional perspective view of the spacing conveyor of FIG. 4A, according to one embodiment.

Figure 5E:
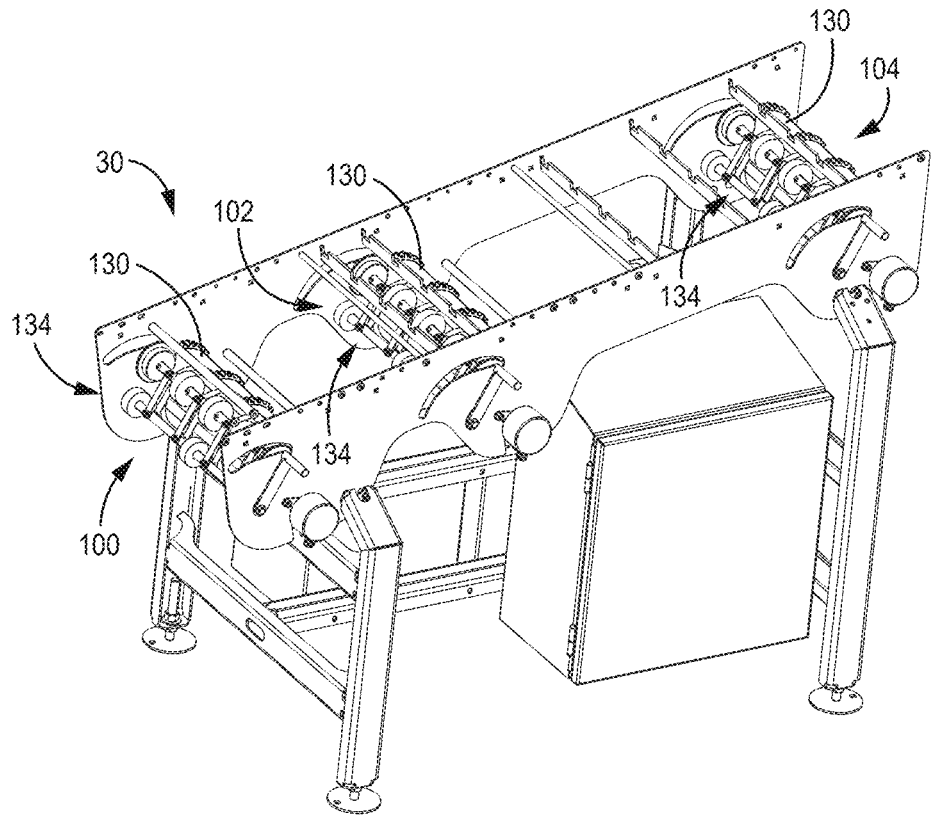

FIG. 5E is a cutaway perspective view of the spacing conveyor of FIG. 4A, according to one embodiment.

Figure 5F:
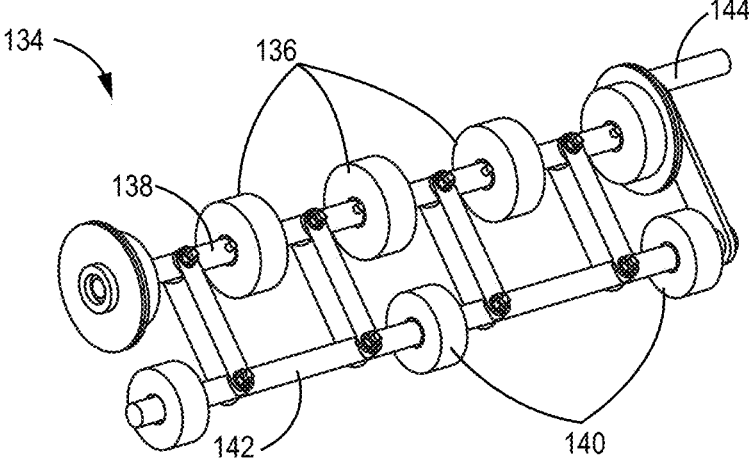

FIG. 5F is a perspective view of a tensioning apparatus, according to one embodiment.

Figure 6A:
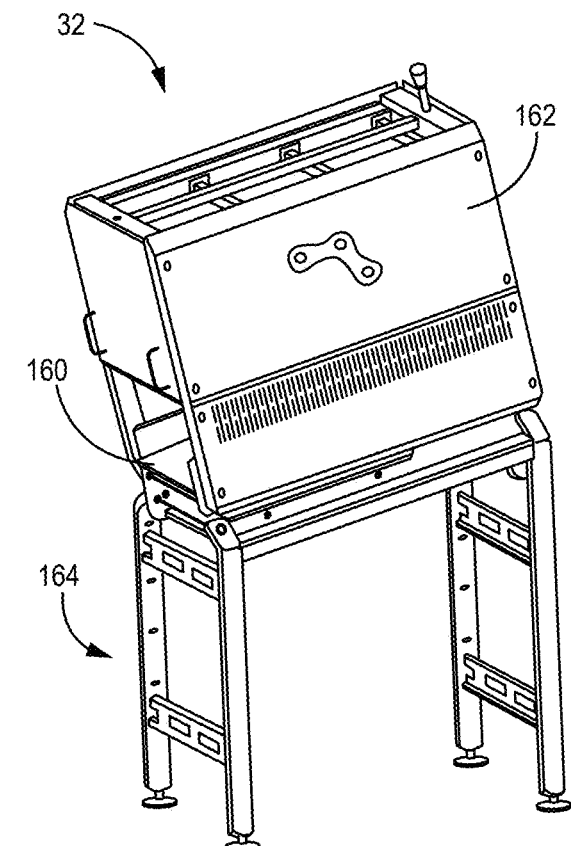

FIG. 6A is a perspective view of a classification device, according to one embodiment.

Figure 6B:
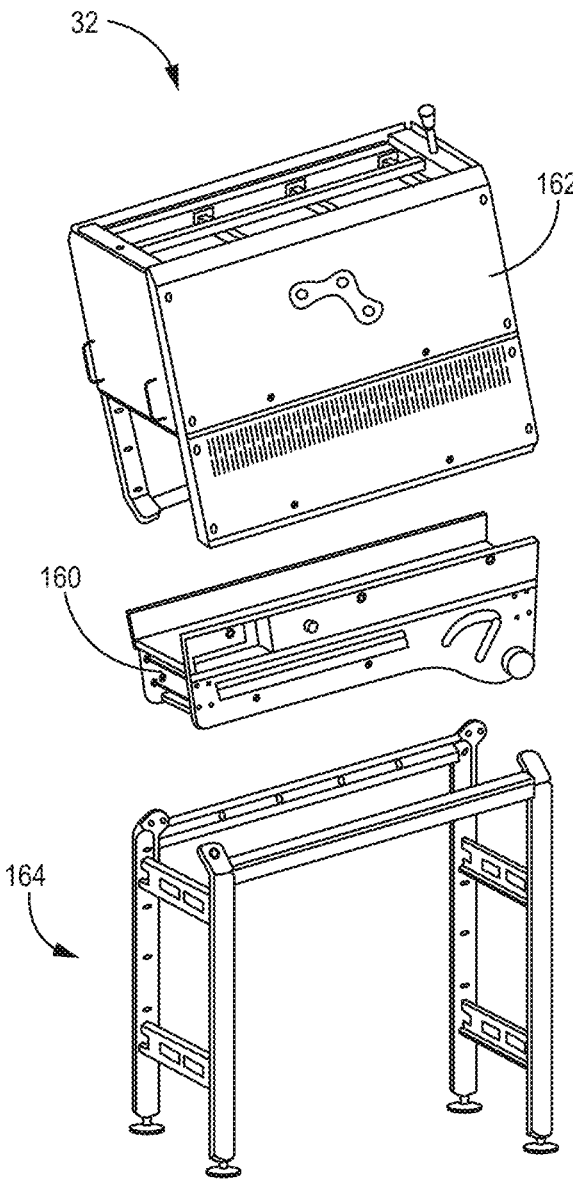

FIG. 6B is an exploded view of the classification device of FIG. 6A, according to one embodiment.

FIG. 6B is an exploded view of the classification device of FIG. 6A, according to one embodiment.

Figure 7A:
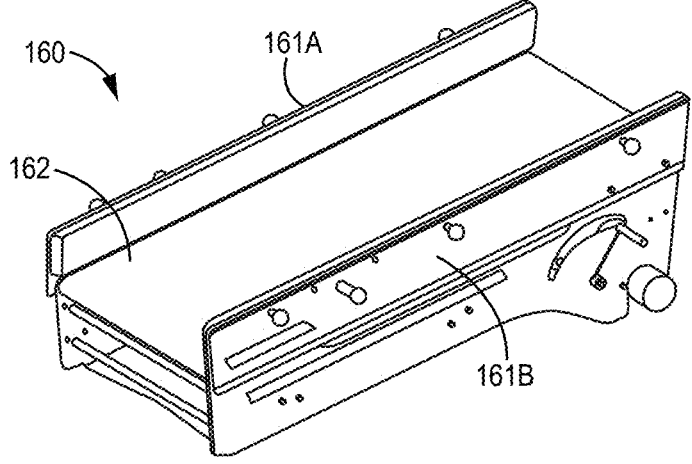

FIG. 7A is a perspective view of a conveyor for a classification device, according to one embodiment.

Figure 7B:
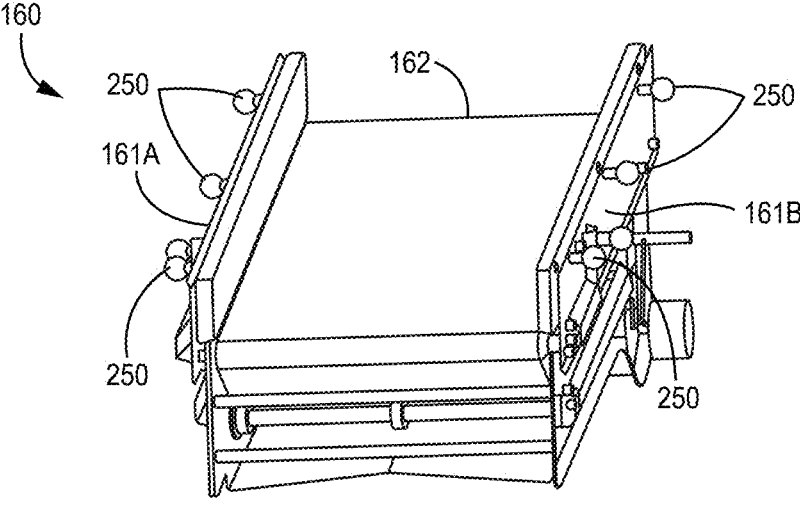

FIG. 7B is another perspective view of the conveyor of FIG. 7A, according to one embodiment.

Figure 7C:
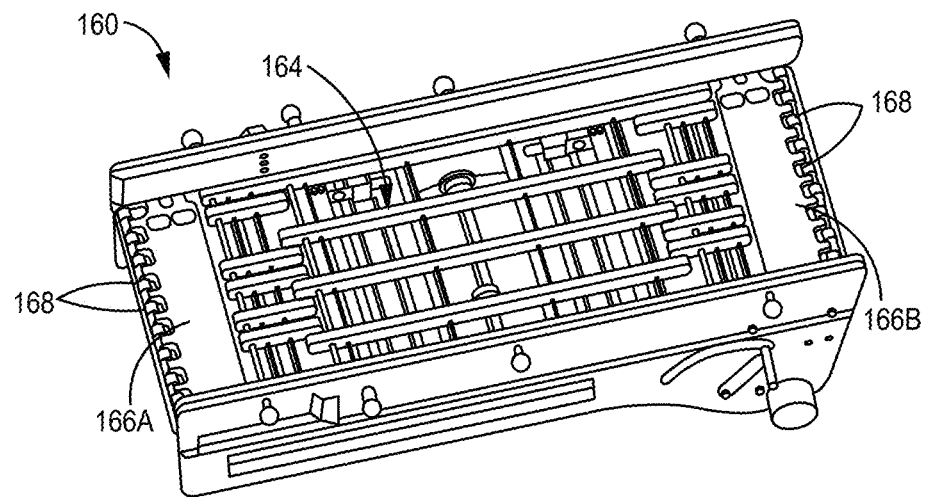

FIG. 7C is a perspective cutaway view of the conveyor of FIG. 7A, according to one embodiment.

Figure 7D:
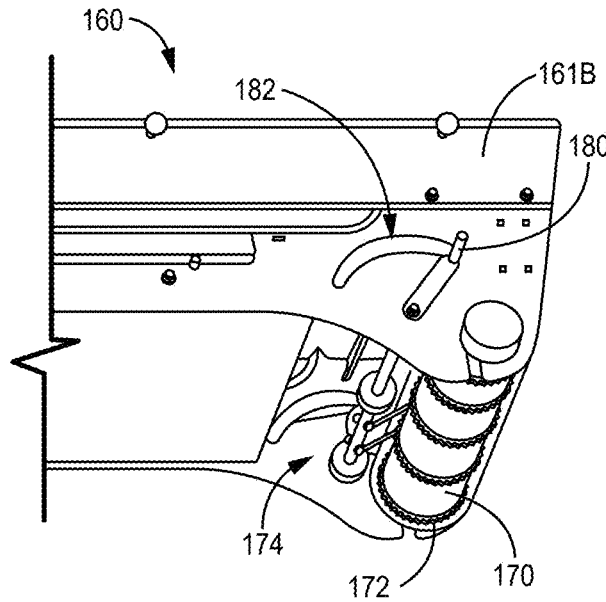

FIG. 7D is a perspective view of the underside of the conveyor of FIG. 7A, according to one embodiment.

Figure 7E:
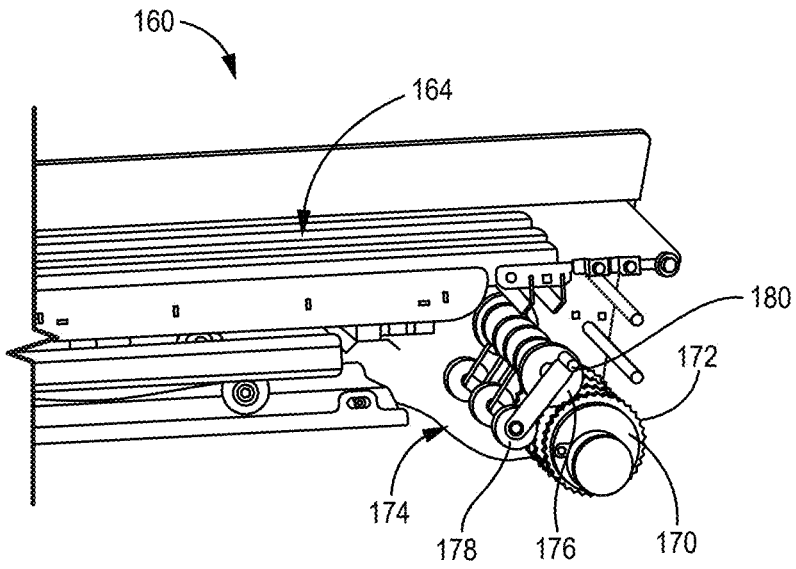

FIG. 7E is another perspective cutaway view of the conveyor of FIG. 7A, according to one embodiment.

Figure 7F:
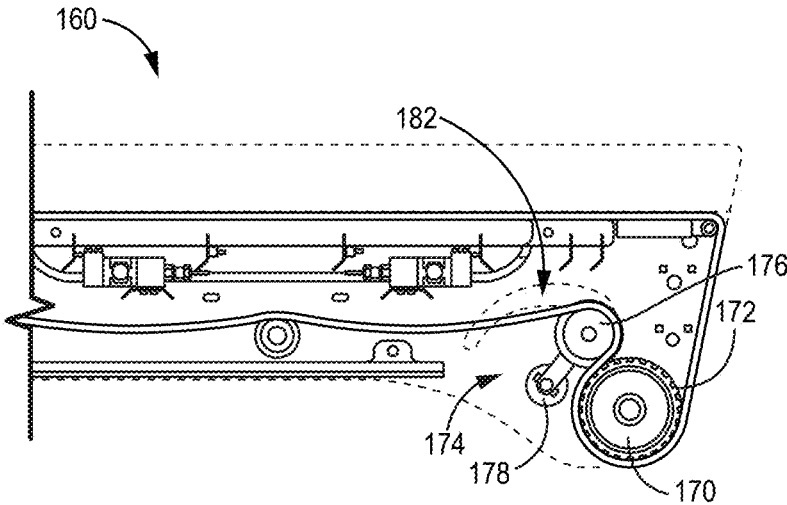

FIG. 7F is a cross-sectional side view of the conveyor of FIG. 7A, according to one embodiment.

Figure 7G:
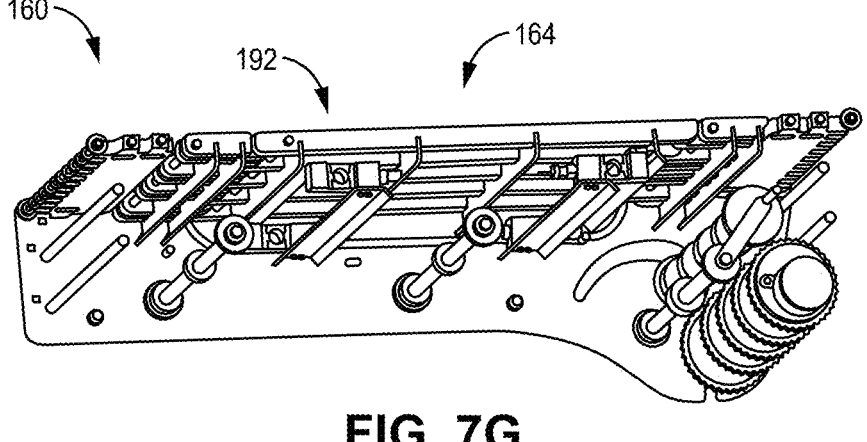

FIG. 7G is a perspective cutaway view of the underside of the conveyor of FIG. 7A, according to one embodiment.

Figure 7H:
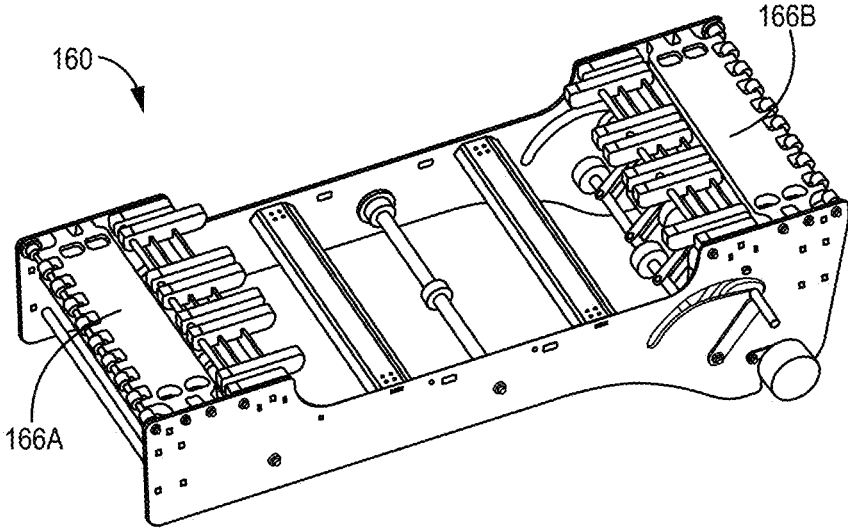

FIG. 7H is another perspective cutaway view of the conveyor of FIG. 7A, according to one embodiment.

Figure 7I:
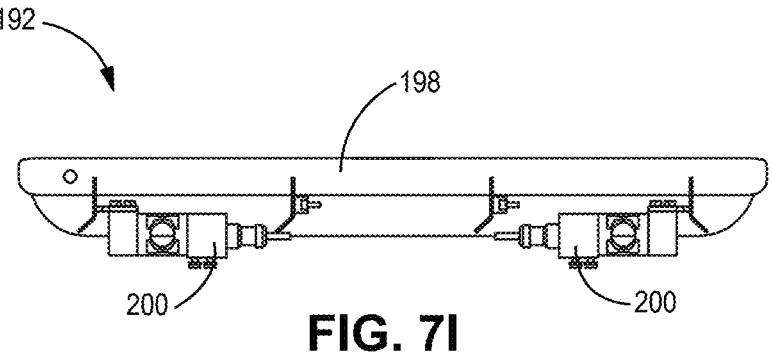

FIG. 7I is a side view of a scale frame, according to one embodiment.

Figure 7J:
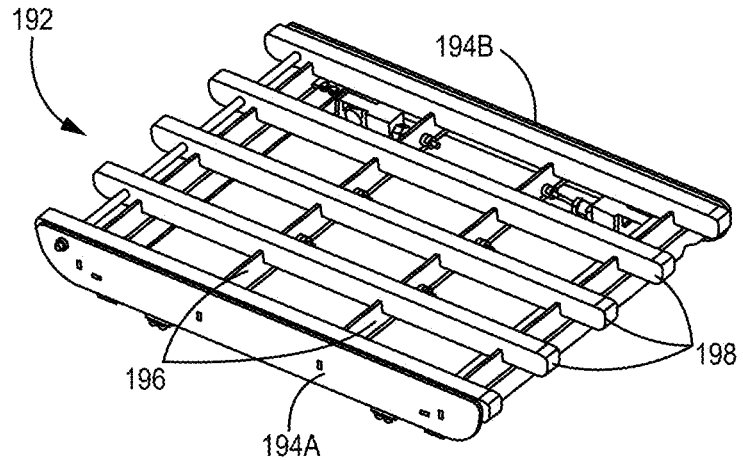

FIG. 7J is a perspective view of the scale frame of FIG. 7I, according to one embodiment.

Figure 7K:
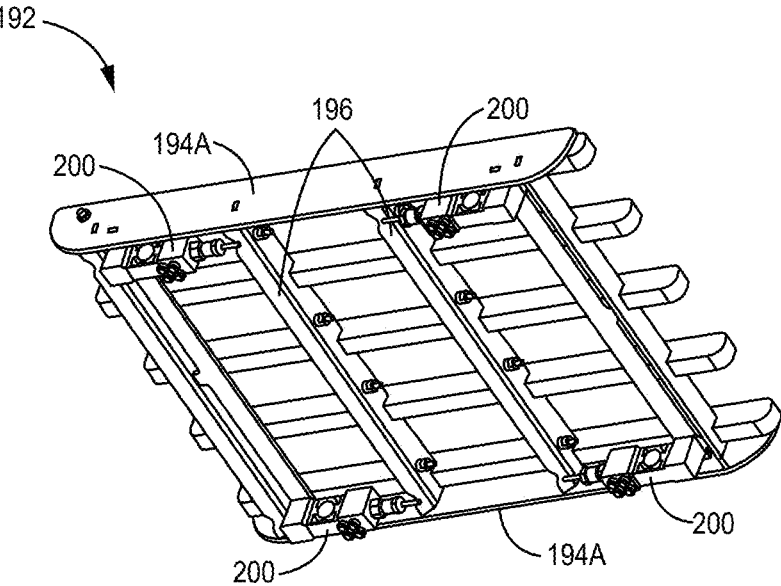

FIG. 7K is a perspective view of the underside of the scale frame of FIG. 7I, according to one embodiment.

Figure 7L:
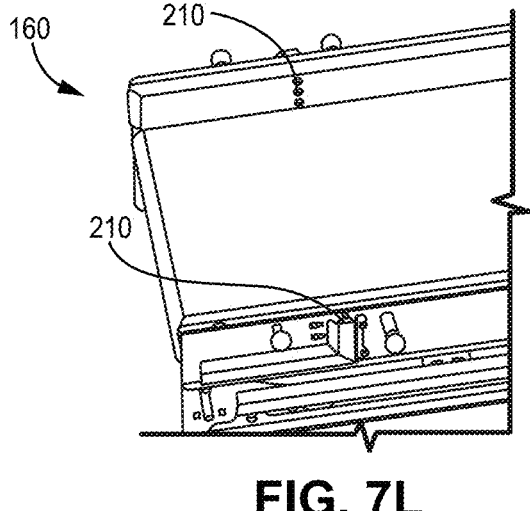

FIG. 7L is a perspective view of a portion of the conveyor of FIG. 7A, according to one embodiment.

Figure 8A:
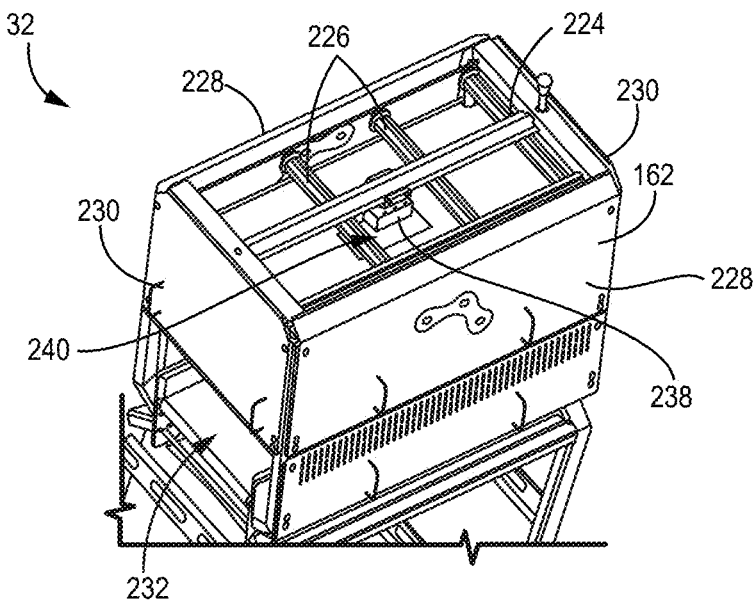

FIG. 8A is a perspective view of classification device hood, according to one embodiment.

Figure 8B:
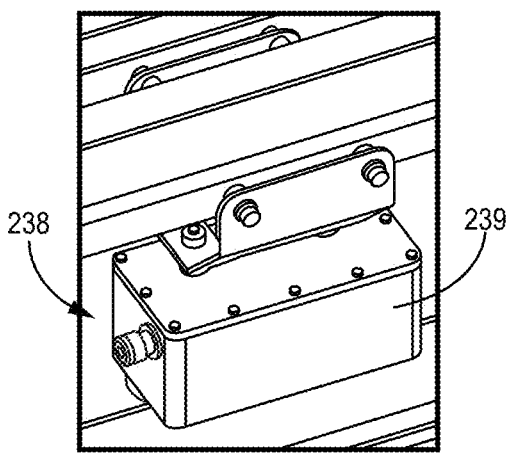

FIG. 8B is a perspective view of an imaging device in the device hood of FIG. 8A, according to one embodiment.

Figure 8C:
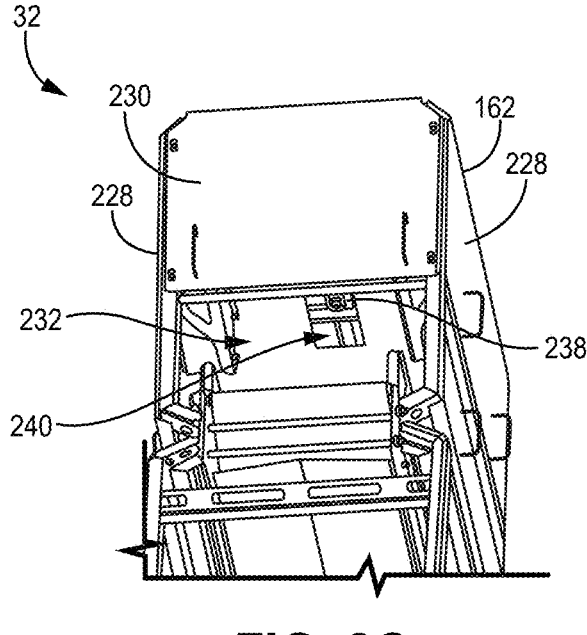

FIG. 8C is a perspective view of the underside of the device hood of FIG. 8A, according to one embodiment.

Figure 8D:
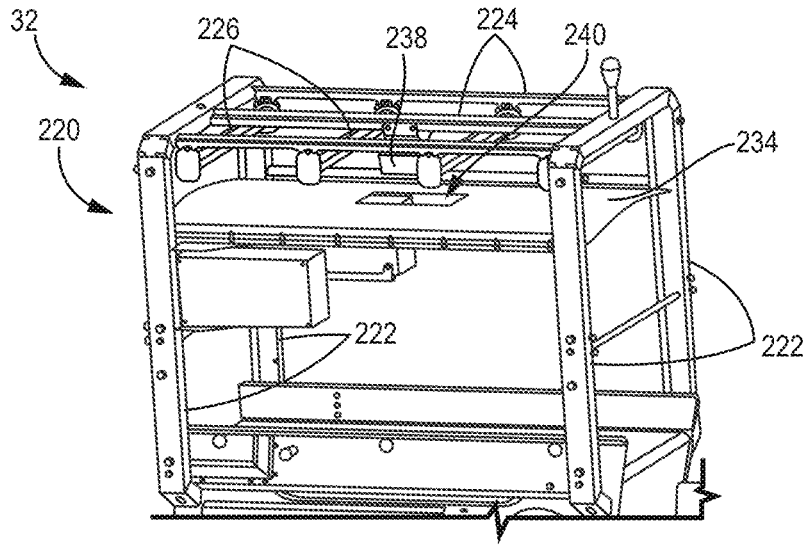

FIG. 8D is a perspective view of the frame of the device hood of FIG. 8A, according to one embodiment.

4

Figure 8E:
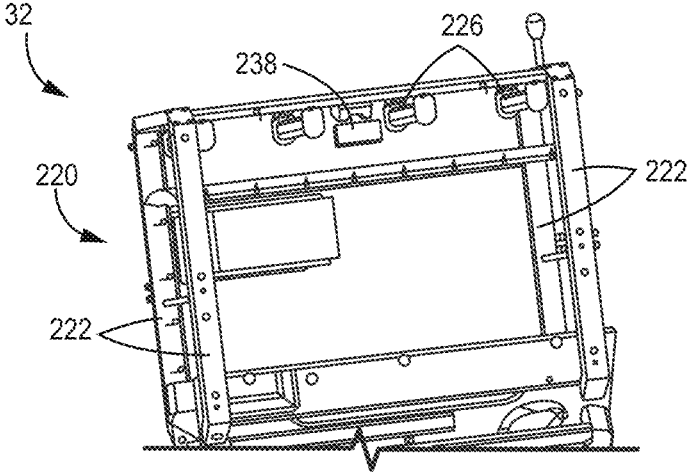

FIG. 8E is another perspective view of the frame of the device hood of FIG. 8A, according to one embodiment.

Figure 9A:
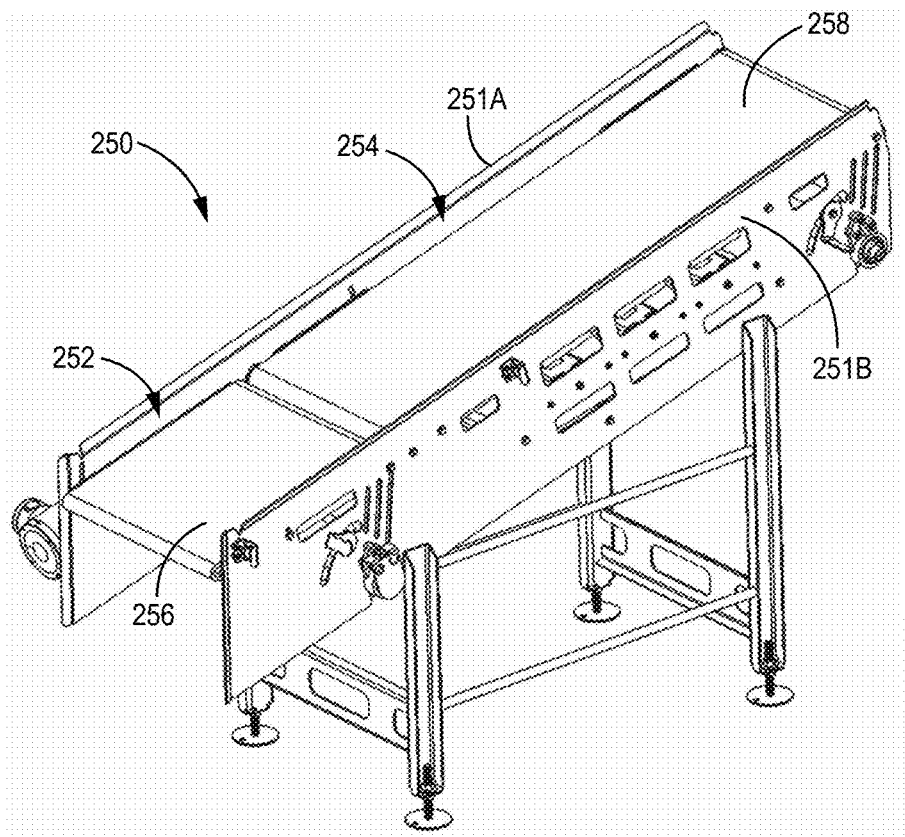

FIG. 9A is a perspective view of a spacing conveyor and scale conveyor system, according to one embodiment.

Figure 9B:
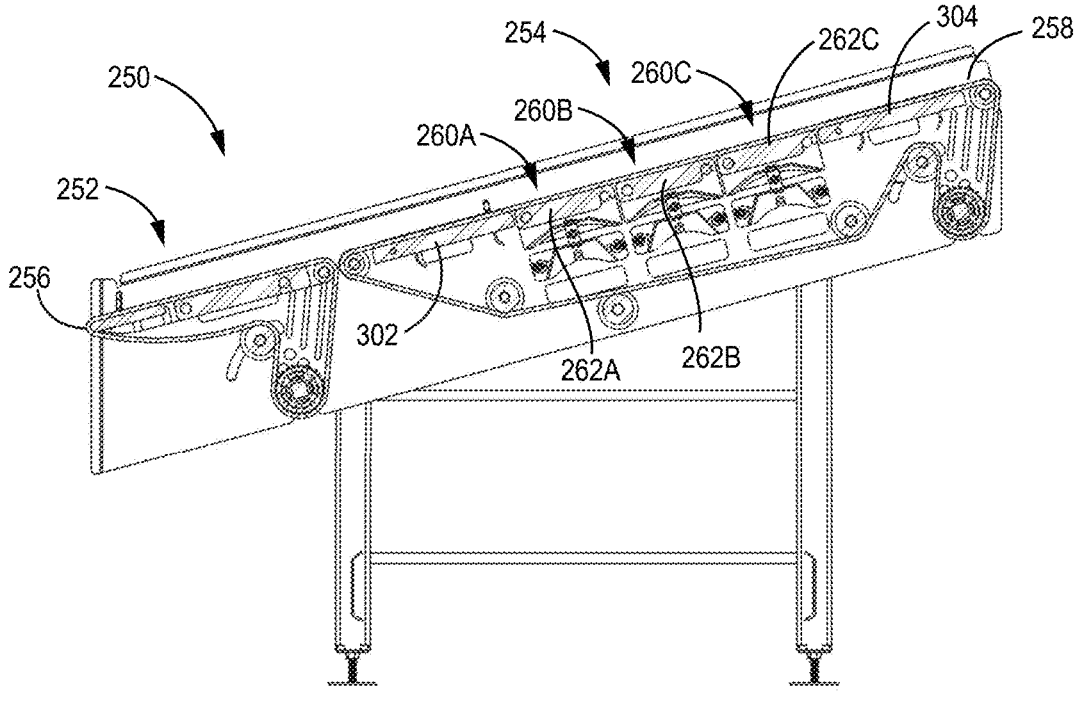

FIG. 9B is a cross-sectional side view of the spacing conveyor and scale conveyor system of FIG. 9A, according to one embodiment.

Figure 10:
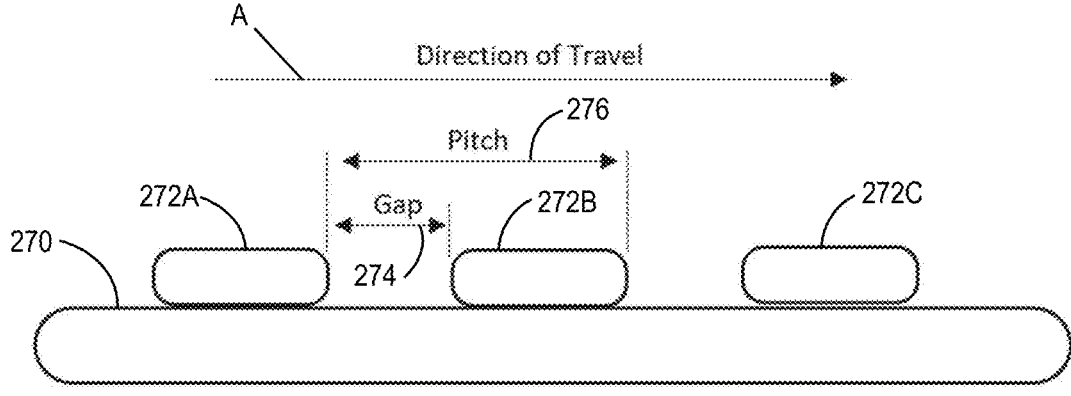

FIG. 10 is a schematic depiction of uniform products traveling along a conveyor belt, according to one embodiment.

Figures 11A, 11B:
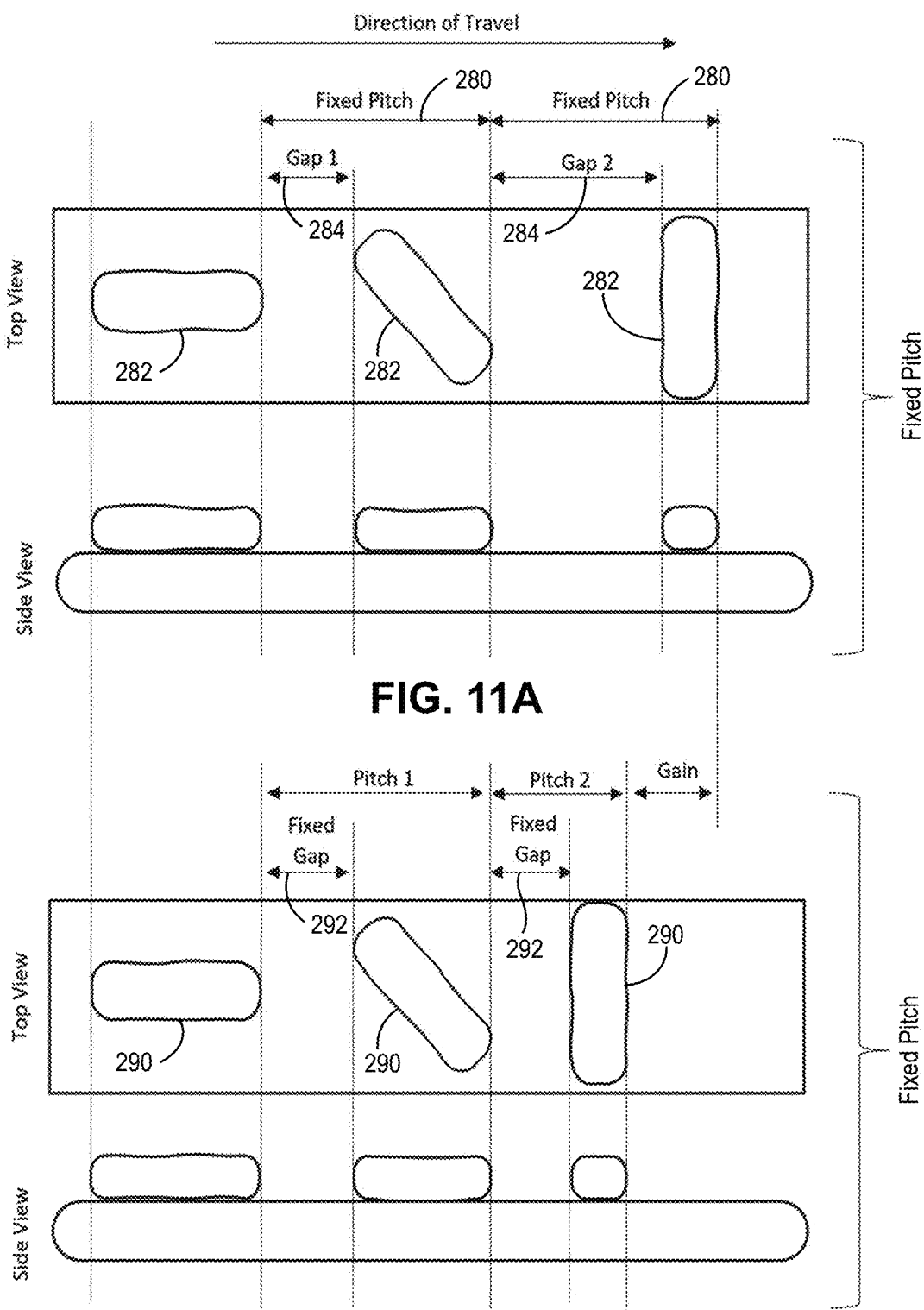

FIG. 11A is a schematic depiction of non-uniform products separated by a fixed pitch along a conveyor belt, according to one embodiment.

FIG. 11B is a schematic depiction of non-uniform products separated by a fixed gap along a conveyor belt, according to one embodiment.

Figures 12A, 12B, 12C:
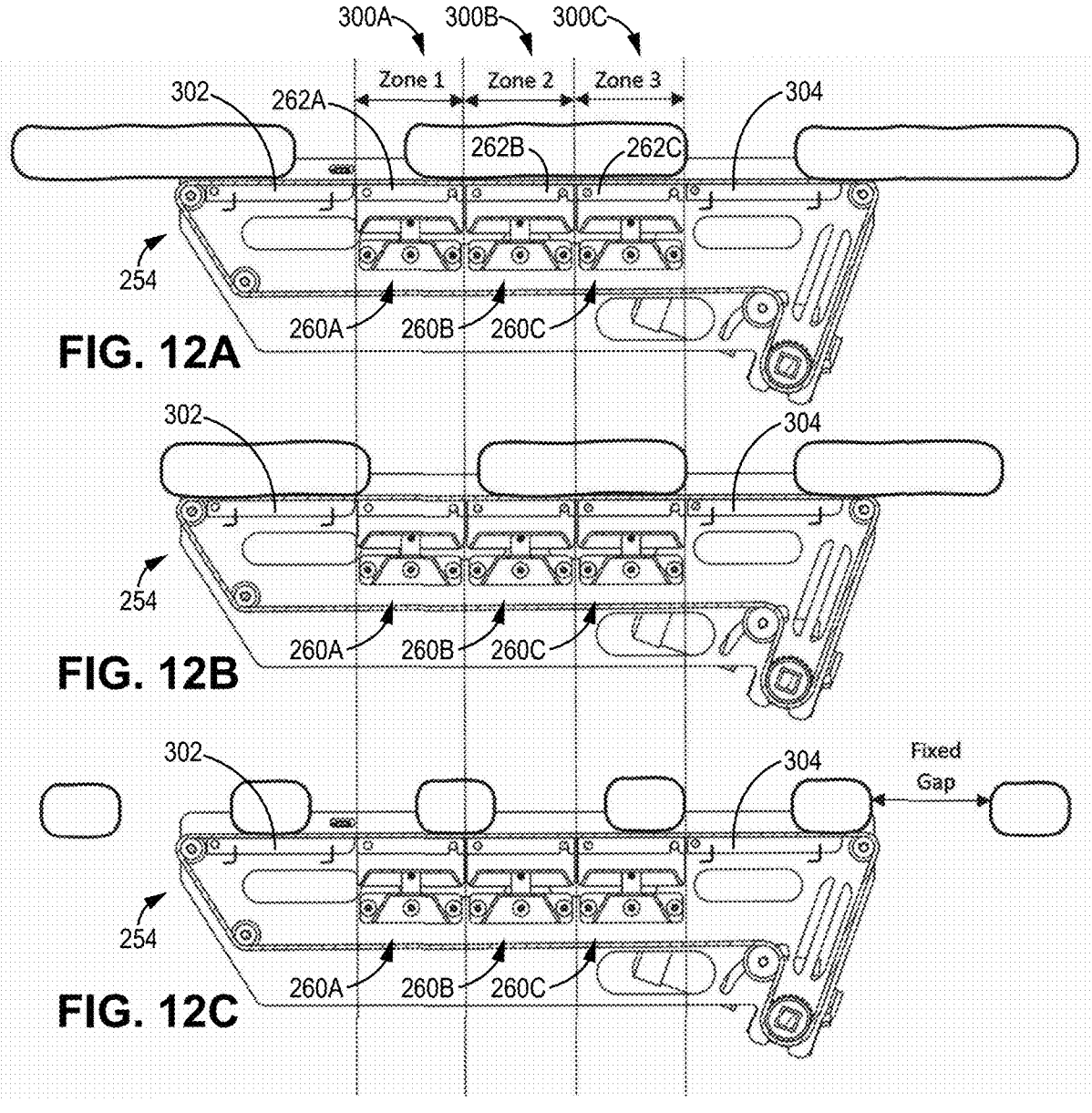

FIG. 12A is cross-sectional side view of a scale conveyor with a schematic depiction of products traveling along the conveyor belt, according to one embodiment.

FIG. 12B is another cross-sectional side view of a scale conveyor with a schematic depiction of products traveling along the conveyor belt, according to one embodiment.

FIG. 12C is another cross-sectional side view of a scale conveyor with a schematic depiction of products traveling along the conveyor belt, according to one embodiment.

Figure 13A:
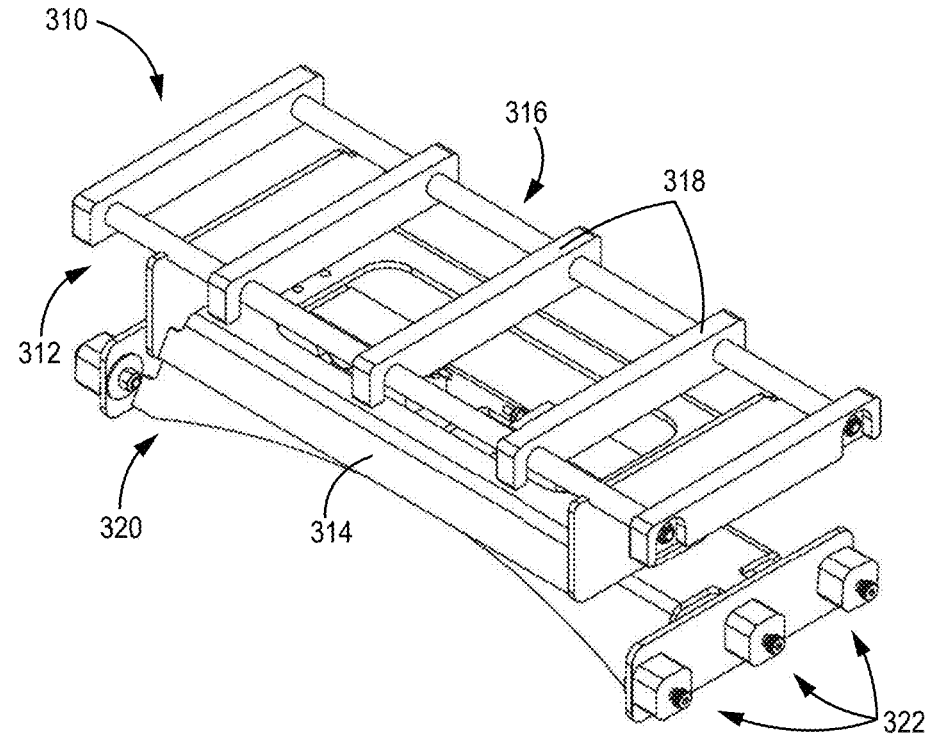

FIG. 13A is a perspective view of a scale assembly, according to one embodiment.

Figure 13B:
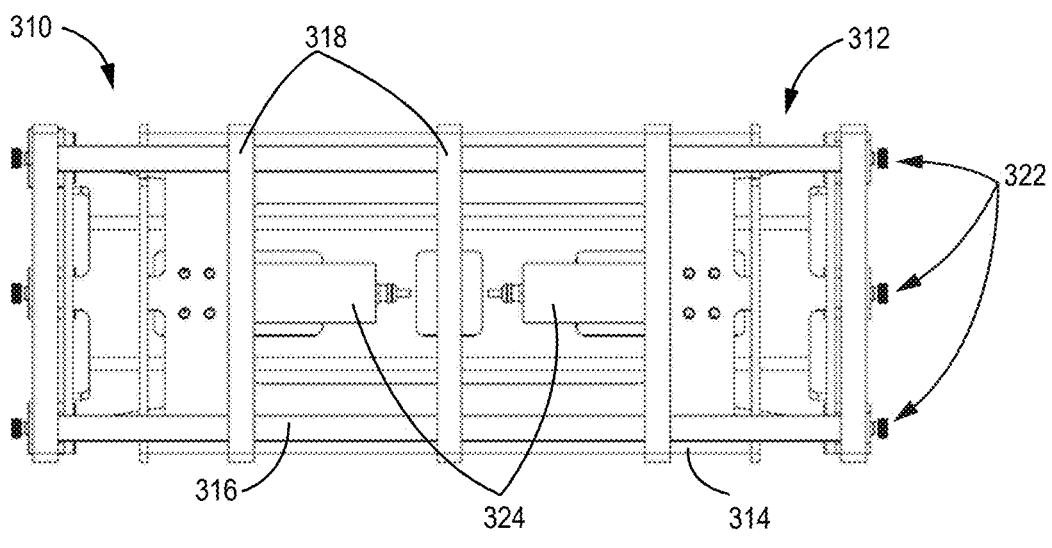

FIG. 13B is a top view of the scale assembly of FIG. 13A, according to one embodiment.

FIG. 13C is a side view of the scale assembly of FIG. 13A, according to one embodiment.

FIG. 13D is an end view of the scale assembly of FIG. 13A, according to one embodiment.

FIG. 14A is a top view of a scale leveling spacer nut, according to one embodiment.

FIG. 14B is a perspective view of the scale leveling spacer nut of FIG. 14A, according to one embodiment.

FIG. 14C is a side view of the scale leveling spacer nut of FIG. 14A, according to one embodiment.

Figure 15A:
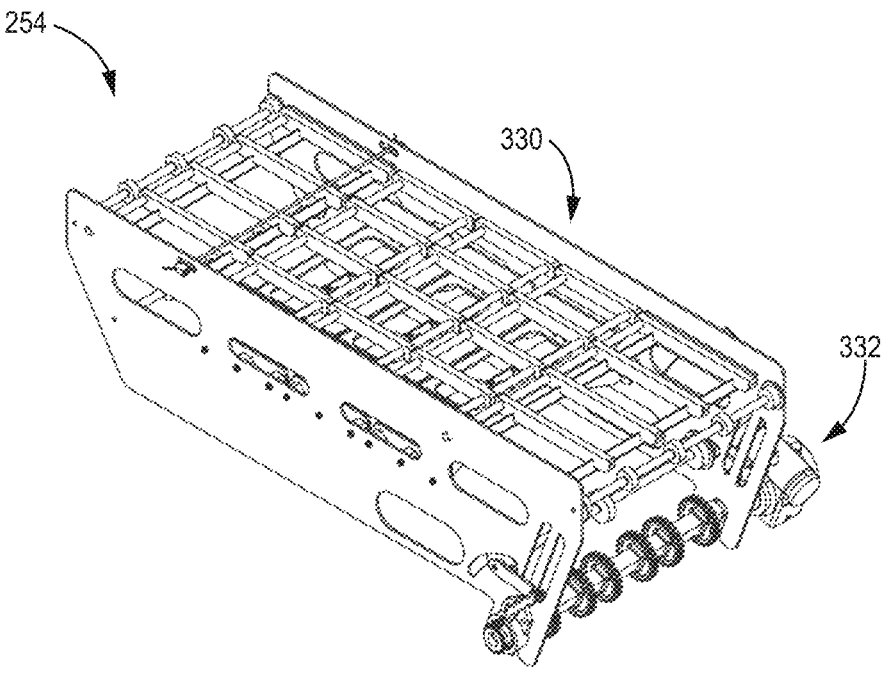

FIG. 15A is a perspective view of a scale conveyor, according to one embodiment.

Figure 15B:
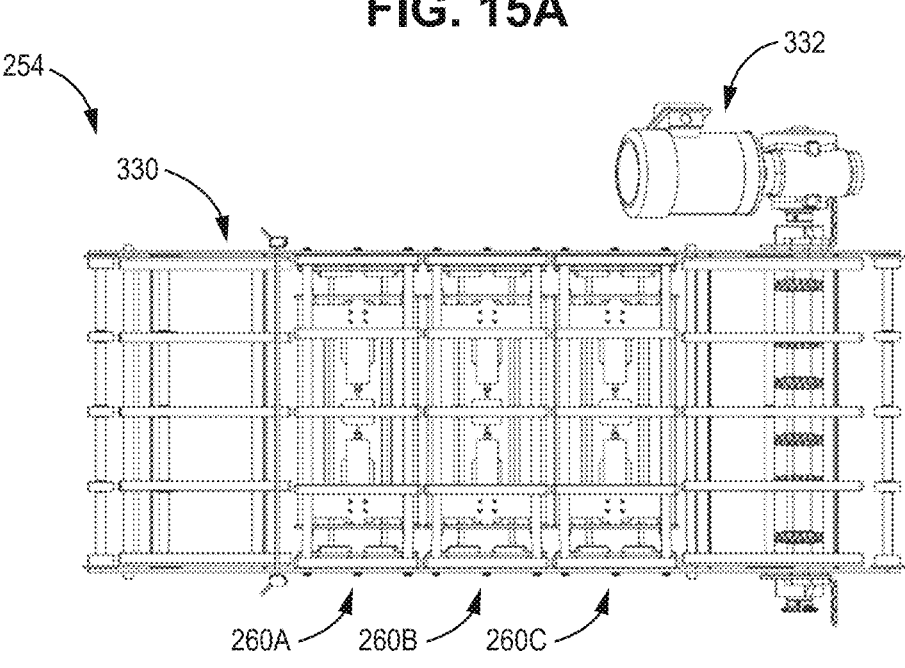

FIG. 15B is a top view of the scale conveyor of FIG. 15A, according to one embodiment.

Figure 15C:
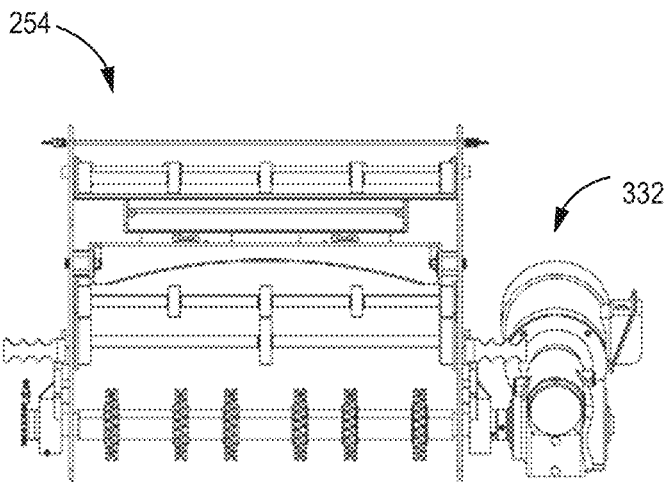

FIG. 15C is an end view of the scale conveyor of FIG. 15A, according to one embodiment.

Figure 16:
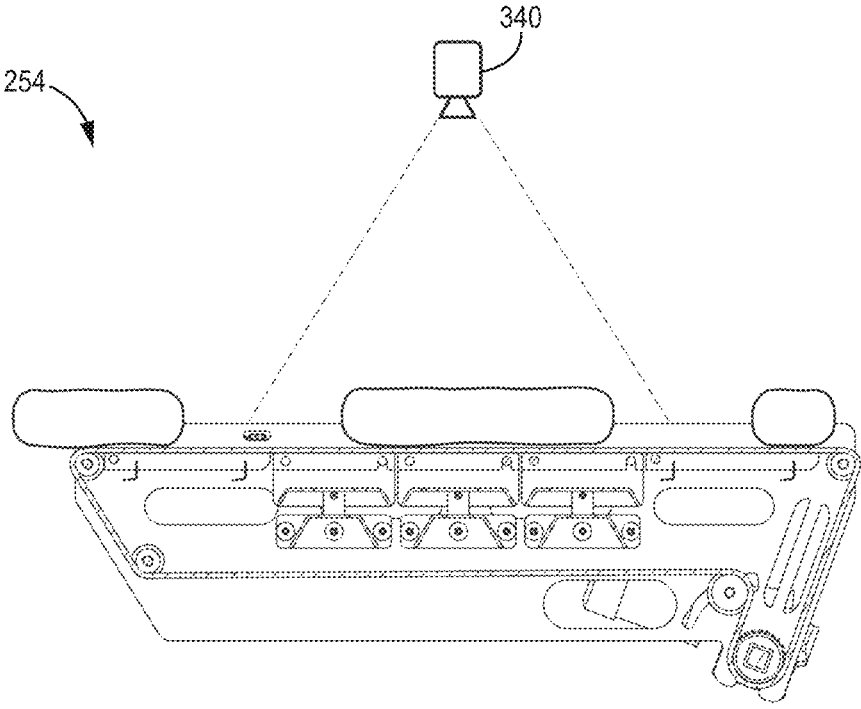

FIG. 16 is a cross-sectional side view of a scale conveyor with an imaging device and with a schematic depiction of products traveling along the conveyor belt, according to one embodiment.

Figures 17A, 17B:
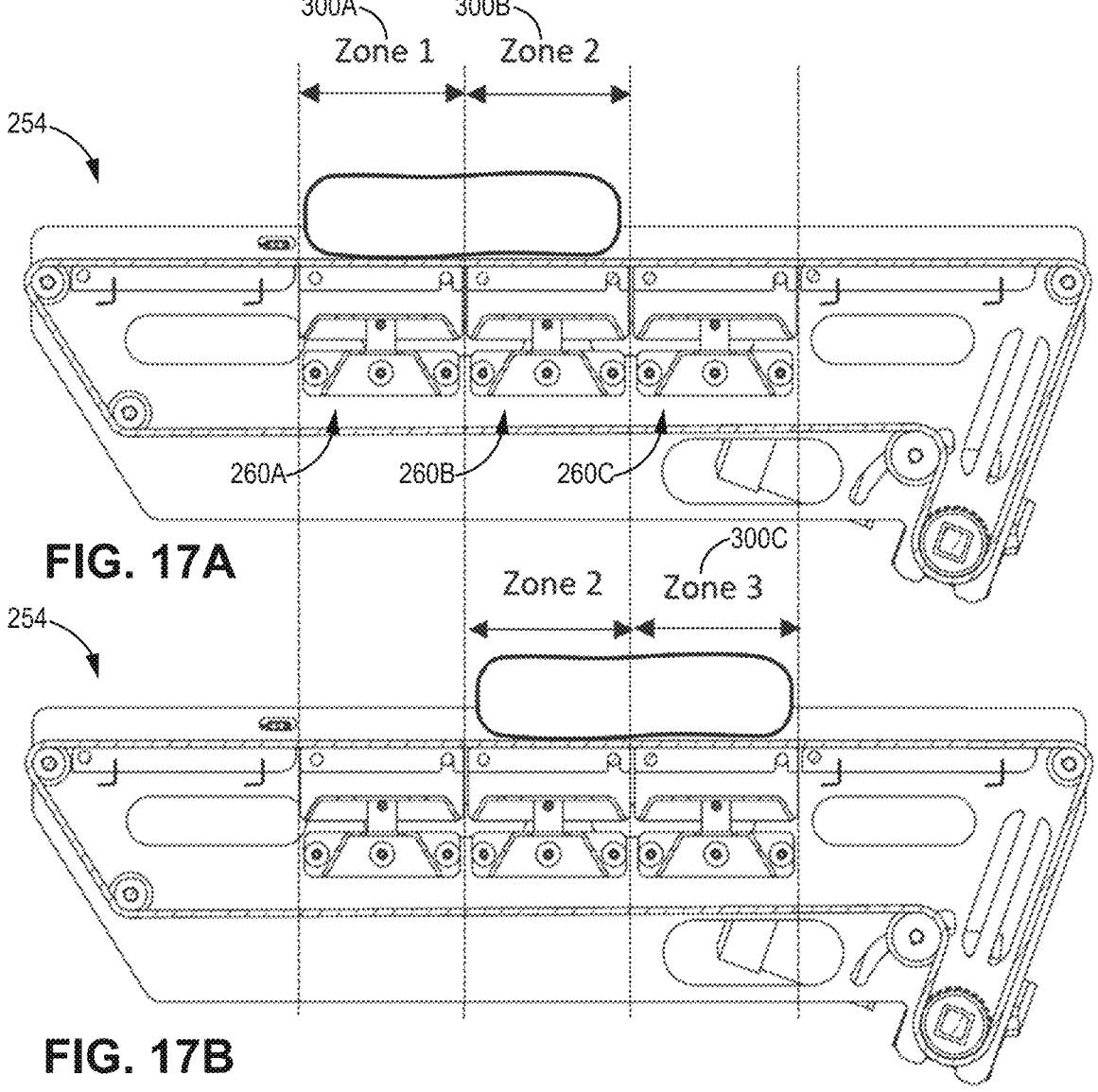

FIG. 17A is another cross-sectional side view of a scale conveyor with a schematic depiction of products traveling along the conveyor belt, according to one embodiment.

FIG. 17B is another cross-sectional side view of the scale conveyor of FIG. 17A with a schematic depiction of products traveling along the conveyor belt, according to one embodiment.

Figures 18A, 18B:
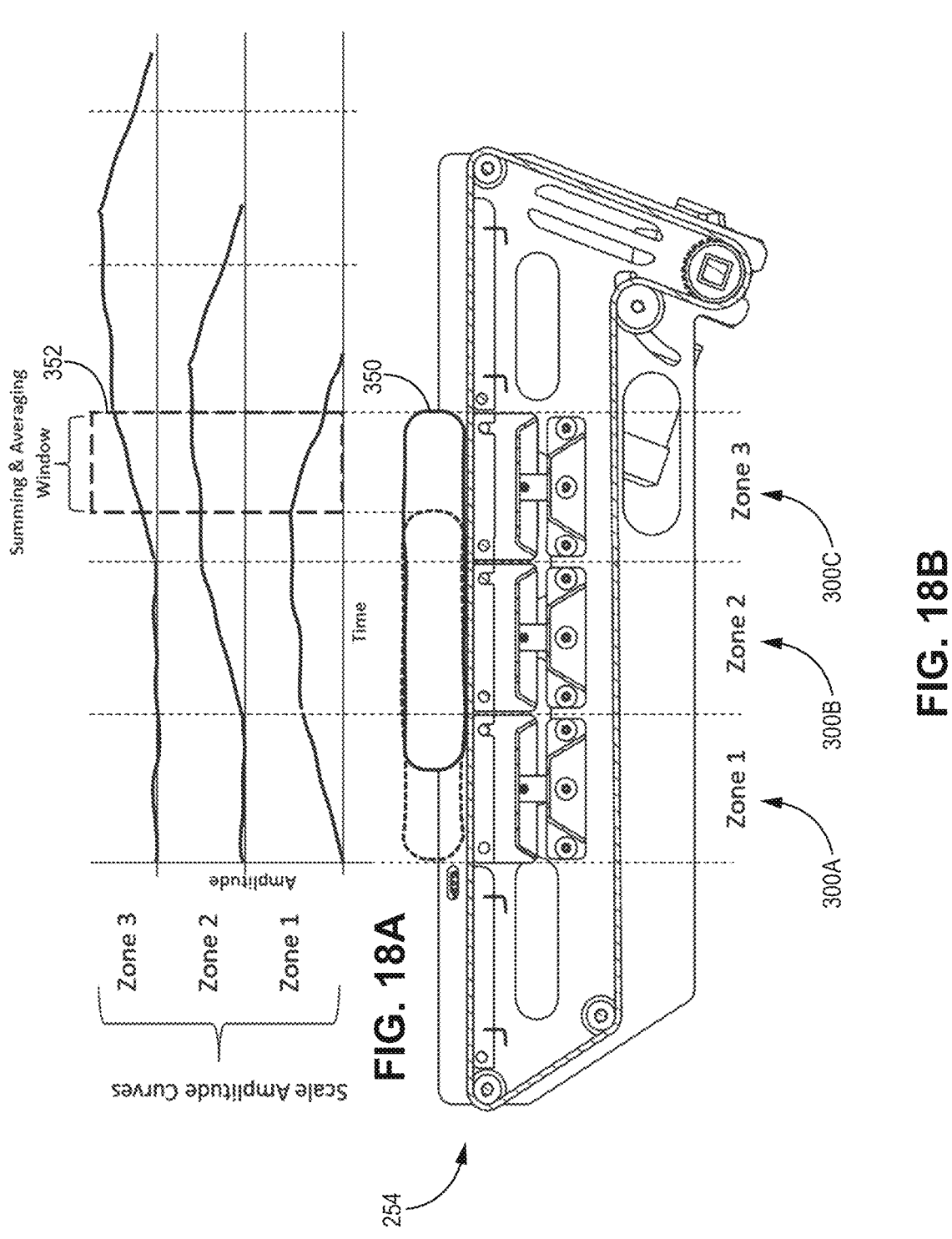

FIG. 18A is a graphical depiction of weight measurements taken over time within the scale zones of the scale conveyor as shown in FIG. 18B, according to one embodiment.

FIG. 18B is another cross-sectional side view of the scale conveyor of FIG. 17A with a schematic depiction of a product traveling along the conveyor belt, according to one embodiment.

Figures 19A, 19B, 19C, 19D:
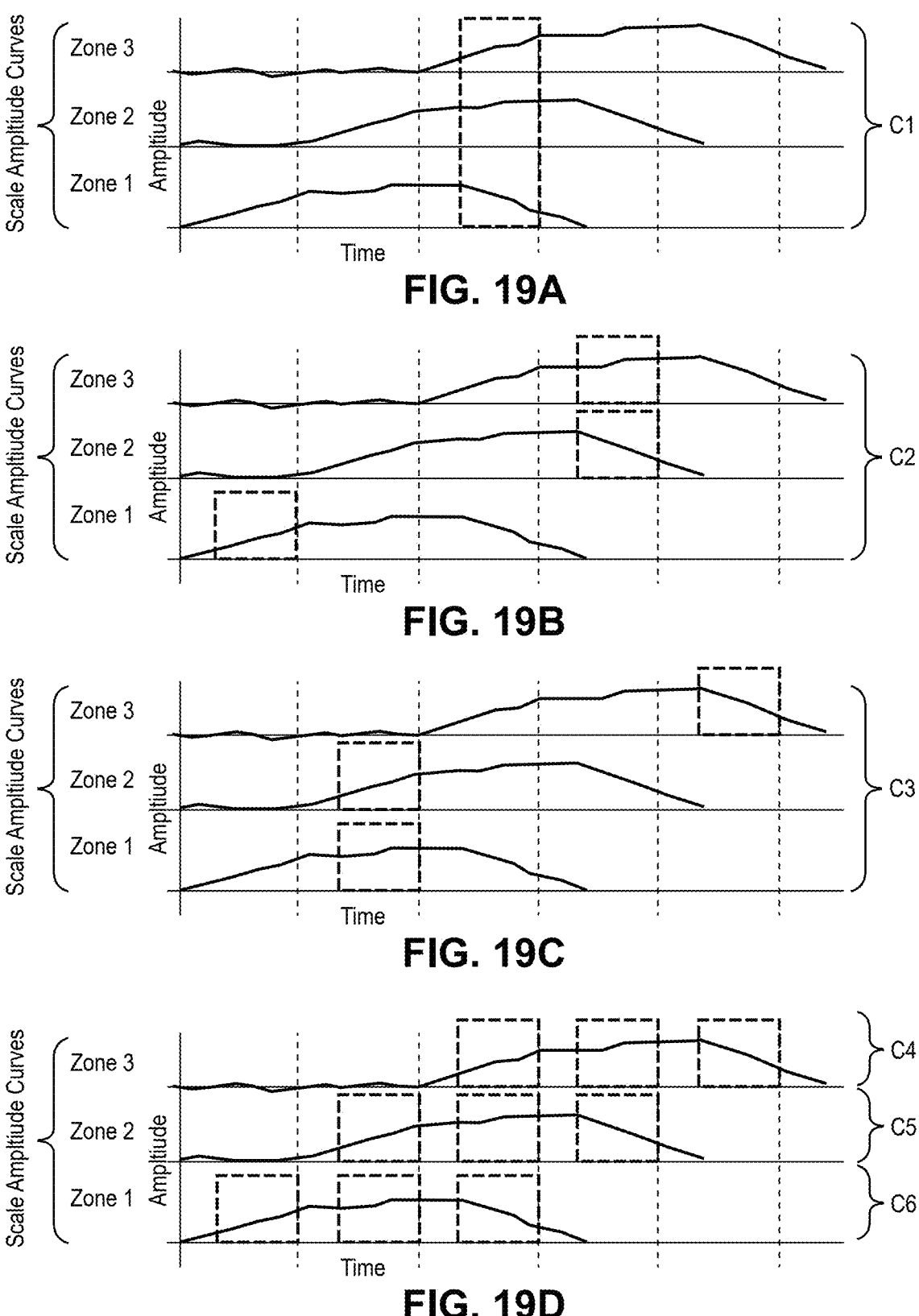

FIG. 19A is a graphical depiction of weight measurements taken over time by a scale conveyor, according to one embodiment.

FIG. 19B is another graphical depiction of weight measurements taken over time by a scale conveyor, according to one embodiment.

FIG. 19C is another graphical depiction of weight measurements taken over time by a scale conveyor, according to one embodiment.

FIG. 19D is another graphical depiction of weight measurements taken over time by a scale conveyor, according to one embodiment.

DETAILED DESCRIPTION

The various embodiments herein relate to a product transport devices, and more specifically to a spacing conveyor for spacing products from one another and to a classification conveyor for gathering information about each product.

Figure 1:
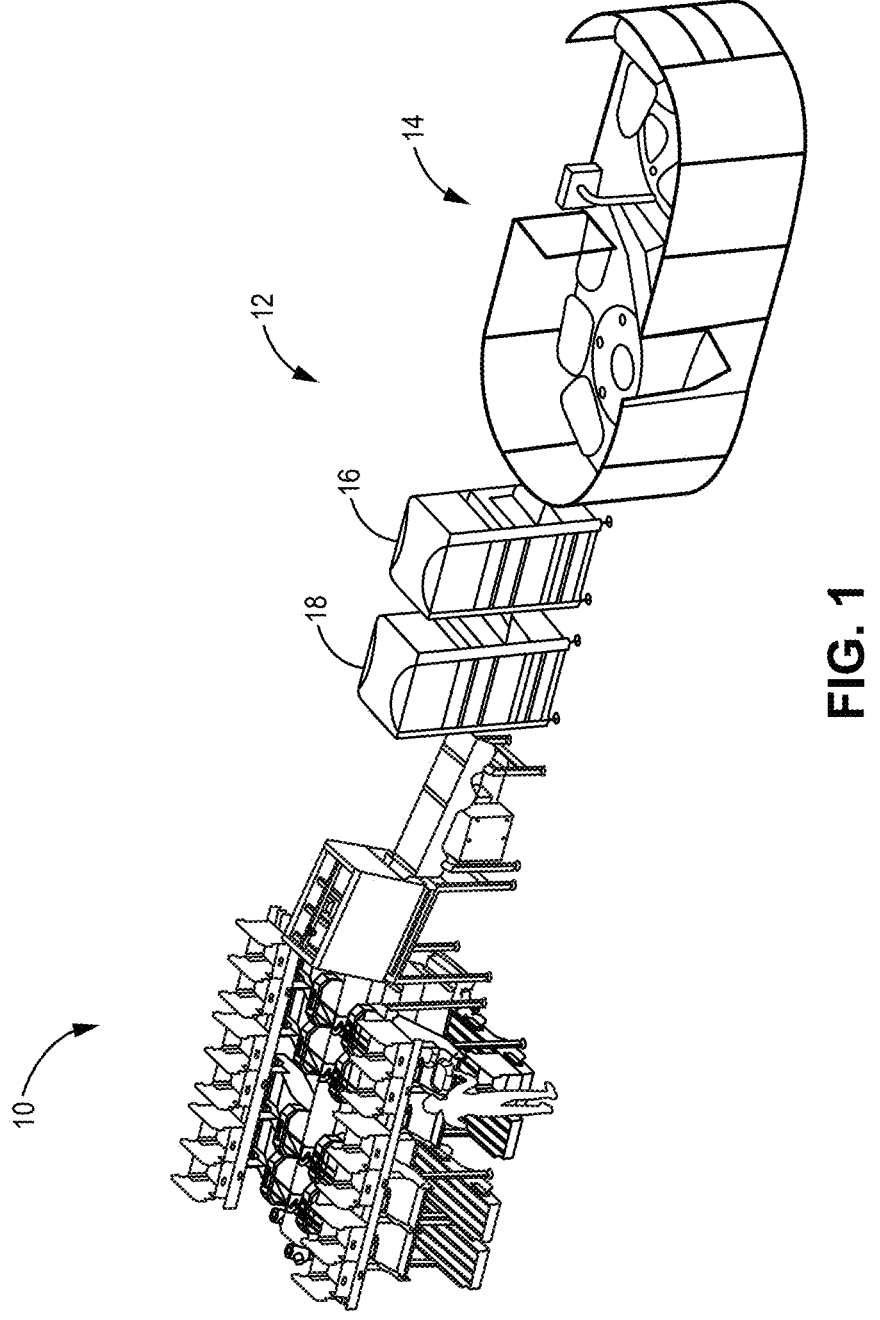
FIG. 1 is a perspective view of a product processing and packing system receiving products from a vacuum-sealing system, according to one embodiment.

In certain implementations, the spacing conveyor and classification conveyor (also referred to as a classification system) can be used in conjunction with or incorporated into a product processing and packing system. One exemplary system embodiment 10 is shown in FIG. 1, in which the product processing and packing system 10 receives meat products from a known vacuum-sealing system 12 that vacuum seals each individual meat product. The vacuum-sealing system 12 has a vacuum sealer 14 that vacuums and seals the meat product into a packaging, a shrink tunnel 16 that uses hot water to shrink the bag tighter around the meat, and a blower 18 that dries the vacuum-sealed meat product. The processing system 10 receives the vacuum-sealed meat product from the blower 18 and classifies, sorts, and ultimately packs that product into a box or other bulk packaging. In other embodiments, the pack-off system 10 and any other system embodiment disclosed or contemplated herein receives meat products from any known vacuum-sealing system or any other product conveyance system. Further, the various pack-off systems herein can receive meat products which are packaged or unpackaged. In further alternatives, any of the exemplary pack-off systems herein may be configured to receive other types of products.

One embodiment of the spacing conveyor 30 and the classification conveyor 32 incorporated into the exemplary product processing system 10 of FIG. 1 is shown in additional detail in FIG. 2. More specifically, FIG. 2A depicts the entire system 10, including the product processing and packing equipment system 11 and the associated computing device and servers (and related software) 54 used to operate the processing and packing equipment system 11 and the overall system 10. The spacing conveyor 30 and the classification conveyor 32 transport the products into the rest of the processing and packing equipment system 11. The system 11 also has a sort conveyor 34 with multiple sorting pushers 36, and multiple loading stations 38 disposed along the sort conveyor 34 adjacent to the pushers 36. Each loading station 38 includes a product chute 40 adjacent to the conveyor 34, a box loading area 42 at the end of the chute 40, and a takeaway conveyor 44 disposed under the chute 40. In certain implementations, each loading station 38 can also have a computer interface (not shown) that can display certain information about the products being boxed at that station 38 and further can allow for a user to interact with the interface to input information and/or control certain aspects of the system 10. There is also an empty box conveyor 46 positioned across and above the loading stations 38. Further, the system 10 also has a packed box conveyor 48 disposed adjacent to the takeaway conveyors 44 and a rejected product conveyor 50 disposed above the packed box conveyor 48 such that the rejected product conveyor 50 is disposed between the sort conveyor 34 above and the packed box conveyor 48 below.

A full description of the product processing and packing system embodiments into which any of the various spacing and/or classification devices can be incorporated is disclosed in U.S. patent application Ser. No. 18/449,537, entitled "Product Classification, Sorting, and Packing Systems and Methods," which was filed on Aug. 14, 2023 and is hereby incorporated herein by reference in its entirety.

Further, as shown in FIGS. 2B and 2C, various computing device 54 embodiments with one or more servers 56 can be coupled to any of the systems disclosed or contemplated herein via a network 58 such as the internet 58 or the like. More specifically, FIG. 2B depicts one version of a computer device 54 for use with the system 10 (or any system herein) while FIG. 2C depicts another version of a computer device 54 that can be used with the system 10 (or any system herein).

FIG. 2B is a schematic diagram illustrating one exemplary embodiment of a computing device 54 configured to perform the techniques described herein. In certain implementations, the device 54 is a comprehensive system designed for use in product processing, including meat packing facilities, and other industrial settings. The device consists of two main components: the data center 60 and the packoff line 61. In certain embodiments, the data center 60 is on premises. The data center 60 hosts managed network switches 62, database servers 63, computer vision servers 64, and application servers 65. In certain embodiments, these servers 63, 64, 65 run the software that operates the product processing equipment as described in detail herein. The packoff line 61 has a managed switch 66 that facilitates communication and data transfer among the various components of the computing device 54. Further, the packoff line 61 can be coupled to a computer vision camera 67 that, according to certain embodiments, is disposed within the classification system 32 as described herein such that the camera 67 can capture image frames of the products and transmit them to the computer vision servers 64. The computer vision servers 64 can perform product classification and geometric feature analysis on the images as described in further detail elsewhere herein. In addition, the packoff line 61 also has a controller 68 that helps to operate the real-time sorting function of the processing equipment. More specifically, in certain embodiments, the controller is a programmable logic controller ("PLC") 68 that actuates the pushers 36 to urge items into the predetermined loading stations 38 as described in detail elsewhere herein. Further, the packoff line 61 can also have interfaces 69 (such as interfaces 45 discussed above and elsewhere herein) that allow operators to interact with the system 10. In certain exemplary embodiments, the interfaces 69 are touch screen human-machine interfaces ("HMI") that display real-time product classification information and collect valuable feedback and inputs from the operators as described in additional detail elsewhere herein, helping to optimize and create a more efficient packing process.

According to an alternative implementation, FIG. 2C depicts another example of a computing device 54 configured to perform the techniques described herein. Computing device 54 of FIG. 2C is described below as an example of computing device 54 in FIG. 2A. FIG. 2C illustrates only one additional example of computing device 54, and many other examples of computing device 54 may be used in other instances and may include a subset of the components included in example computing device 54 or may include additional components not shown in FIG. 2C.

Computing device 54 may be any computer with the processing power required to adequately execute the techniques described herein. For instance, computing device 54 may be any one or more of a mobile computing device (e.g., a smartphone, a tablet computer, a laptop computer, etc.), a desktop computer, a wearable computing device (e.g., a smart watch, computerized glasses, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2C, computing device 54 includes user interface components (UIC) 70, one or more processors 72, one or more communication units 74, one or more input components 76, one or more output components 78, and one or more storage components 80. UIC 70 includes display component 82 and presence-sensitive input component 84. Storage components 80 of computing device 54 include communication module 86, analysis module 88, and data store 90.

One or more processors 72 may implement functionality and/or execute instructions associated with computing device 54 to operate various aspects of the product processing embodiments herein. That is, processors 72 may implement functionality and/or execute instructions associated with computing device 54 to control functionalities such as product spacing, classification, sorting, packing, etc.

Examples of processors 72 include any combination of application processors, display controllers, auxiliary processors, one or more sensor hubs, and any other hardware configured to function as a processor, a processing unit, or a processing device, including dedicated graphical processing units (GPUs). Modules 86 and 88 may be operable by processors 72 to perform various actions, operations, or functions of computing device 54 for operation of the various system embodiments herein (including system 10). In certain specific embodiments, the programmable controller such as the PLC 68 discussed above can also be operable by the processors 72 to perform various actions relating to the product processing systems herein, including, for example, product sorting. In other examples, processors 72 of computing device 54 may retrieve and execute instructions stored by storage components 80 that cause processors 72 to perform the various operations of the system implementations herein. The instructions, when executed by processors 72, may cause computing device 54 to operate the system equipment, including, for example, the conveyors, the classification system, the sorting equipment, the loading stations, etc.

Communication module 86 may execute locally (e.g., at processors 72) to provide functions associated with managing a user interface (e.g., user interfaces 45) that computing device 54 provides at UIC 70 for example, for facilitating interactions between an operator and the system 10. In some examples, communication module 86 may act as an interface to a remote service accessible to computing device 54. For example, communication module 86 may be an interface or application programming interface (API) to a remote server that controls managing user interfaces 45 that computing device 54 provides at UIC 70 for facilitating interactions between an operator and the system.

In some examples, analysis module 88 may execute locally (e.g., at processors 72) to provide functions associated with the various functionalities of the system embodiments herein, such as analyzing the data captured by the various sensors placed throughout product processing system 10 in order to control diverter arm 440. In some examples, analysis module 88 may act as an interface to a remote service accessible to computing device 54. For example, analysis module 88 may be an interface or application programming interface (API) to a remote server that controls the product analysis and receives diverter arm positioning information based on such analysis.

One or more storage components 80 within computing device 54 may store information for processing during operation of computing device 54 (e.g., computing device 54 may store data accessed by modules 86 and 88 during execution at computing device 54). In some examples, storage component 80 is a temporary memory, meaning that a primary purpose of storage component 80 is not long-term storage. Storage components 80 on computing device 54 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 80, in some examples, also include one or more computer-readable storage media. Storage components 80 in some examples include one or more non-transitory computer-readable storage mediums. Storage components 80 may be configured to store larger amounts of information than typically stored by volatile memory. Storage components 80 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 80 may store program instructions and/or information (e.g., data) associated with modules 86 and 88 and data store 90. Storage components 80 may include a memory configured to store data or other information associated with modules 86 and 88 and data store 90.

Communication channels 94 may interconnect each of the components 70, 72, 74, 76, 78, and 80 for inter-component communications (physically, communicatively, and/or operatively). In some examples, communication channels 94 may include a system bus, a network connection, an inter-process communication data structure, or any other method for communicating data.

One or more communication units 74 of computing device 54 may communicate with external devices—such as the product processing equipment and systems—via one or more wired and/or wireless networks by transmitting and/or receiving network signals on one or more networks. Examples of communication units 74 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 74 may include short wave radios, cellular data radios, wireless network radios, as well as universal serial bus (USB) controllers.

One or more input components 76 of computing device 54 may receive input. Examples of input are tactile, audio, and video input. Input components 76 of computing device 54, in one example, include a presence-sensitive input device (e.g., a touch sensitive screen, a PSD), a button or other actuable component, mouse, keyboard, voice responsive system, camera, microphone or any other type of device for detecting input from a human or machine, including such a device associated with the processing equipment of the various systems herein. In some examples, input components 76 may include one or more sensor components (e.g., sensors 92). Sensors 92 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, one or more presence sensors such as those used in certain components of the product processing equipment, and one or more other sensors (e.g., infrared proximity sensor, hygrometer sensor, and the like). Other sensors, to name a few other non-limiting examples, may include a radar sensor, a lidar sensor, a sonar sensor, magnetometer, or a compass sensor. The sensors include any sensor that might be incorporated into the product processing equipment of any of the various implementations herein, including the various sensors and data gathering devices associated with any of the various embodiments of the product spacing conveyor 30 and the classification conveyor 32 as disclosed or contemplated herein.

One or more output components 78 of computing device 54 may generate output in a selected modality. Examples of modalities may include a tactile notification, audible notification, visual notification, machine generated voice notification, or other modalities. Output components 78 of computing device 54, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality. In one exemplary embodiment, the output component can be a button on the loading station, as described in further detail elsewhere herein.

UIC 70 of computing device 54 includes display component 82 and presence-sensitive input component 84. Display component 82 may be a screen, such as any of the displays or systems described with respect to output components 78, at which information (e.g., a visual indication) is displayed by UIC 70 while presence-sensitive input component 84 may detect an object at and/or near display component 82. In one specific embodiment, the UIC 70 can be the interface 45 described in additional detail elsewhere herein.

While illustrated as an internal component of computing device 54, UIC 70 may also represent an external component that shares a data path with computing device 54 for transmitting and/or receiving input and output. For instance, in one example, UIC 70 represents a built-in component of computing device 54 located within and physically connected to the external packaging of computing device 54 (e.g., a screen on a mobile phone). In another example, UIC 70 represents an external component of computing device 54 located outside and physically separated from the packaging or housing of computing device 54 (e.g., a monitor, a projector, etc. that shares a wired and/or wireless data path with computing device 54).

UIC 70 of computing device 54 may detect two-dimensional and/or three-dimensional gestures as input from a user of computing device 54. For instance, a sensor of UIC 70 may detect a user's movement (e.g., moving a hand, an arm, a pen, a stylus, a tactile object, etc.) within a threshold distance of the sensor of UIC 70. UIC 70 may determine a two or three-dimensional vector representation of the movement and correlate the vector representation to a gesture input (e.g., a hand-wave, a pinch, a clap, a pen stroke, etc.) that has multiple dimensions. In other words, UIC 70 can detect a multi-dimension gesture without requiring the user to gesture at or near a screen or surface at which UIC 70 outputs information for display. Instead, UIC 70 can detect a multi-dimensional gesture performed at or near a sensor which may or may not be located near the screen or surface at which UIC 70 outputs information for display.

In accordance with one or more techniques of the various system embodiments herein, communication module 86 may control various components of the processing/packing equipment system 11 herein to optimize the operation thereof. For example, the communication module 86 can control one or more sensors to capture sensor data, including, for example, sensor data collected from the camera, scale, and other sensors in the classification system (such as conveyor 32), sensor data collected from the various presence sensors and encoders disposed along the spacing conveyor 30 and other chutes, conveyors, and pushers (including chutes 40, conveyors 34, 44, 50, 48, 46, pushers 36, etc.) of the overall processing system herein, input data collected by computer interfaces and input buttons, and any other data collected at any type of sensor, interface, or actuable component (such as a button or the like).

In one exemplary embodiment, the analysis module 88 can analyze the captured sensor data from the spacing conveyor 30 (and subsequently the sorting conveyor 34) to determine a specific location of each product as it moves onto the spacing conveyor 30. Based at least in part on the product location, analysis module 88 may then determine when to actuate the first conveyor section 100, the second conveyor section 102, and/or the third conveyor section 104 such that the product is sufficiently spaced from the product ahead of it on the conveyor 30 and the product behind it on the conveyor 30 as shown in FIG. 4A. Based on the above determinations of the analysis module 88, the communication module 86 may control the three conveyor sections 100, 102, 104 to place the product in the proper position in the third conveyor section 104 with the desired spacing in relation to the adjacent products based on the determination made by analysis module 88.

According to another embodiment, the analysis module 88 can analyze the captured sensor data from the classification device (such as system 32, for example), including the camera, the scale, etc., to determine a product classification for the product. Based at least in part on the product classification, analysis module 88 may then determine various actions to take based on the classification of the produce, such as which position of a plurality of positions to place the pusher or diverter arm (such as pusher 36 or diverter arm or any other such device for urging products of the sort conveyor 34) such that the product is guided into the proper loading station (such as station 38), bulk container, other target receptacle or area, or to the defective product conveyor 50 or other area for defective products. Based on the above determinations of the analysis module 88, the communication module 86 may control the pusher 36 or diverter arm (or the like) to place it in the proper position based on the determination made by analysis module 88.

In addition, according to certain implementations, the communication module 86 and analysis module 88 can work together in any other way such that the communication module 86 controls any other components of the spacing conveyor 30, the classification device 32, or any other component of the processing/packing equipment system 11 herein to optimize the operation thereof while the analysis module 88 analyzes any type of captured or input data from any type of component of the equipment system 11 in a variety of ways to operate with the communication module 86 to operate the system 10 herein.

The combination of the various product processing and packing equipment systems 11 herein with the various embodiments of the computing device 54 and related components can provide significant advantages over prior known systems. For example, by enabling communication module 86 to control the conveyor sections 100, 102, 104 of the spacing conveyor 30 based on the location of the product and other analysis performed by analysis module 88 as described above, the various system 10 embodiments herein can quickly and easily space the products prior to entering the classification device 32 such that the classification device 32 can easily distinguish between the different products and thus readily collect the relevant information. Further, by enabling communication module 86 to control the pusher 36/diverter arm 440 based on the product classification and other analysis performed by analysis module 88 as described above, the various system 10 embodiments herein can quickly sort and pack multiple different types of products on a same line far more efficiently and with fewer machines/less equipment than known systems. Further, the various other processes that are operated by the communication module 86 and analysis module 88 as discussed above also provide advantages over known systems.

FIG. 3 depicts one exemplary embodiment of the spacing conveyor 30 and the classification system 32 that can be incorporated into any of the various system embodiments herein. As mentioned above, the conveyor 30 can operate to space each product in relation to the adjacent products. In one embodiment, this product spacing process can ensure that the product is appropriately spaced so that it can be successfully weighed in the classification system 32 and/or successfully sorted from the other products on the sort conveyor 34. More specifically, if the products are too close to each other in the classification device 32, the scale will capture the weight of both products and be unable to capture the weight of the individual products. Similarly, if the products are too close to each other on the sort conveyor 34, the pusher 36 attempting to push a specific product off the conveyor 34 may end up pushing two or more different products.

As shown in FIGS. 4A-4B, in one implementation, the spacing conveyor 30 can have three separate conveyor sections 100, 102, 104 in the conveyor 30, each operating independently of the others. Alternatively, the conveyor 30 can have two, four, five, six, or any number of separate conveyor sections that can be operated independently but in conjunction with each other to attain the desired spacing between adjacent products on the conveyor 30.

In this exemplary embodiment, each separate conveyor section 100, 102, 104 has a separate conveyor belt 106, 108, 110 that rotates around its respective section. Further, as best shown in FIGS. 4D, each section 100, 102, 104 has a conveyor bed 112, 114, 116 over which each conveyor belt 106, 108, 110 moves. According to one implementation as shown, each conveyor bed 112, 114, 116 has a different length along the path of the conveyor 30. Thus, the bed 112 of the first section 100 has a first length, the bed 114 of the second section 102 has a second length that is greater than the length of the bed 112, and the bed 116 of the third section 104 has a third length that is greater than the length of the bed 114. In other words, each successive conveyor bed 112, 114, 116 is longer than the previous as shown. Alternatively, the beds 112, 114, 116 can have any combination of lengths.

In certain embodiments, the increasing length of the conveyor beds 112, 114, 116 along the length of the conveyor 30 can optimize the ability of the system 10 herein to create the desired space between each product as it is transported over the conveyor 30. For example, in one embodiment, the first bed 112 has a length based on the shortest product that is expected to pass through the conveyor 30 (such that the first bed 112 is at least as long as the length of the shortest product), while the lengths of the other two beds 114, 116 can be any lengths to take of the remainder of the conveyor 30 length. According to one implementation, the second bed 114 is shorter than the third bed 116.

According to one embodiment as best shown in FIG. 4D, each bed 112, 114, 116 has an end body 118 disposed at each end of the bed 112, 114, 116, with each end body 118 having rollers 120 rotatably disposed along the side of the end body 118 that defines the end of the conveyor bed 112, 114, 116 as shown. An exemplary end body 118 is shown in additional detail in FIG. 4E. As a result, each bed 112, 114, 116 has rollers 120 at each end that allow each belt 106, 108, 110 to easily move across the bed 112, 114, 116 and wrap around the rollers 120 during rotation of each belt 106, 108, 110. Further, the configuration of each bed 112, 114, 116 is determined by the length thereof. As a result, the conveyor bed 112 of the first conveyor section 100, which has the shortest length, is made up of solely two end bodies 118 as shown. In contrast, the conveyor bed 114 of the second conveyor section 102, which is longer than the first bed 112, has a bed rail section 122 disposed between the two end bodies 118 that forms a longer bed 114 than the first bed 112. Further, the conveyor bed 116 of the third conveyor section 104, which is longer than the second bed 114, has a second bed rail section 124 disposed between the two end bodies 118, wherein the second bed rail section 124 is longer than the first bed rail section 122.

As best shown in FIGS. 5A-5E according to one embodiment, each conveyor section 100, 102, 104 has a rotating motor 130 with sprockets 132 or other features around the outer surface of the motor 130 that engages with and urges the corresponding belt 106, 108, 110 to rotate around the motor 130 and the corresponding conveyor bed 112, 114, 116. According to one embodiment, the rotating motor 130 is a drum-style motor 130 that is configured to rotate and thereby drive the rotation of the conveyor belt 106, 108, 110. Alternatively, any known motor—including any such rotating motor—for use with such a conveyor belt can be used.

In addition, each section 100, 102, 104 also has a tensioning apparatus 134 disposed adjacent to the motor 130 that can be used to move each belt 106, 108, 110 from a tensioned or operating configuration to an untensioned configuration. One exemplary tensioning apparatus 134 is shown in further detail in FIG. 5F. The tensioning apparatus 134 has a top set of rollers 136 on first shaft 138, a bottom set of rollers 140 on a second shaft 142, and a handle or lever 144 for urging the apparatus 134 between the tensioned configuration and the untensioned configuration. According to one implementation, the tensioning apparatus 134 rotates between the two configurations around an axis defined by the second shaft 142 such that rotation of the handle 144 causes rotation of the apparatus 134 around the second shaft 142.

As best shown in FIGS. 5B-5D, each belt 106, 108, 110 travels around its associated conveyor section 100, 102, 104 in the following manner. Each motor 130 rotates clockwise, urging the belt 100, 102, 104 around the top set of rollers 136 on the tensioning apparatus 134, around the upstream rollers 120 of the end body 118, across the conveyor bed 112, 114, 116, around the downstream rollers 120 of the opposing end body 118, and back to the motor 130 as shown.

In certain implementations, the tensioning apparatus 134 can be used in the following manner, as best shown in FIGS. 5B and 5C. In FIG. 5B, the tensioning apparatus 134 in the third conveyor section 104 is set in its operating or tensioned configuration with the handle 144 locked in its tensioned position on the right end of the handle slot 146 defined in the side of the conveyor 30. In this configuration, the belt 110 is correctly tensioned to rotate around the section 104 during operation. In contrast, in FIG. 5C, the tensioning apparatus 134 in the third conveyor section 104 is set in its untensioned configuration with the handle 144 having been moved to its untensioned position closer to the left end of the slot 146 as shown. In this configuration, the belt 110 is looser than in the tensioned configuration, thereby allowing for repairs and/or maintenance of the belt 110 and/or any other component of the conveyor section 104.

According to some implementations, the spacing conveyor 30 is also modular, with the three conveyor sections 100, 102, 104 being separable from the legs 150. This can allow for the legs 150 to be adjusted/adjustable to modify the angle of the three conveyor sections 100, 102, 104. In other words, the legs 150 can be adjusted or constructed such that the three conveyor sections 100, 102, 104 form an incline (with products moving up vertically as they move across the three sections 100, 102, 104). Alternatively, the legs 150 can be adjusted or constructed such that the three conveyor sections 100, 102, 104 form a decline (with products moving downward as they move across the three sections 100, 102, 104). In a further alternative, the three sections 100, 102, 104 can be flat.

In addition, the conveyor 30 can also have position or object presence sensors (not shown) disposed along the sides of the conveyor 30 to track the presence of each product as it is urged across the three conveyor sections 100, 102, 104. These sensors are coupled to the computing device 54 of the system 10 and can be used to track the exact position of each product.

In operation, the computing device 54 according to any of the embodiments herein can gather information about a specific product from the presence detection sensors on the conveyor 30. As described in further detail above, the analysis module 88 can analyze the captured sensor data and determine when to actuate the first conveyor section 100, the second conveyor section 102, and/or the third conveyor section 104 such that the product is sufficiently spaced from the product ahead of it on the conveyor 30 and the product behind it on the conveyor 30. Further, the communication module 86 can control the three conveyor sections 100, 102, 104 to place the product in the proper position with the desired spacing in relation to the adjacent products. Alternatively, the system 10 can operate in any known fashion to control the conveyor sections 100, 102, 104 to ensure proper spacing of the products.

Once the product is spaced correctly on the spacing conveyor 30 it is urged from the spacing conveyor into the classification device 32. In one embodiment as shown in FIGS. 6A-6C, the classification device 32 has a conveyor 160, a hood or cover 162 disposed over the conveyor 160, and a set of legs 164 supporting the conveyor 160 and hood 162. As will be explained in additional detail below, the classification device 32 collects a wide variety of information about each product as it passes through the device 32 on the conveyor 160.

According to one embodiment as shown in FIGS. 7A-7G, the conveyor 160 has a conveyor belt 162 and a conveyor bed 164 over which the conveyor belt 162 moves, wherein the conveyor bed 164 is disposed between the sides 161A, 161B of the conveyor 160. As best shown in FIGS. 7C and 7G, the bed 164 has end bodies 166A, 166B disposed at each end of the bed 164, with each end body 166A, 166B having rollers 168 rotatably disposed along the side of each end body 166A, 166B that defines the end of the conveyor bed 164 as shown. According to one exemplary embodiment, each end body 166A, 166B is substantially similar to the end body 118 depicted in FIG. 4E and discussed in detail above. As a result, the bed 164 has rollers 168 at each end that allow the belt 162 to easily move across the bed 164 and wrap around the rollers 168 during rotation of the belt 162.

As best shown in FIGS. 7D and 7E according to one embodiment, the conveyor 160 has a rotating motor 170 with sprockets 172 or other features around the outer surface of the motor 170 that engages with and urges the belt 162 to rotate around the motor 170 and the corresponding conveyor bed 164. According to one embodiment, the rotating motor 170 is a drum-style motor 170 that is configured to rotate and thereby drive the rotation of the conveyor belt 162. Alternatively, any known motor—including any such rotating motor—for use with such a conveyor belt can be used. According to one embodiment, the motor 170 can operate in a fashion similar to the motor 130 discussed in detail above.

In addition, the conveyor 160 also has a tensioning apparatus 174 disposed adjacent to the motor 170 that can be used to move the belt 162 from a tensioned or operating configuration to an untensioned configuration. According to certain implementations, the tensioning apparatus 174 can be substantially similar to and operate in a fashion similar to the tensioning apparatus 134 depicted in FIG. 5F and discussed in detail above. The tensioning apparatus 174 has a top set of rollers 176, a bottom set of rollers 178, and a handle or lever 180 for urging the apparatus 174 between the tensioned configuration and the untensioned configuration.

As best shown in FIGS. 7E and 7F, the belt 162 travels around the conveyor 160 in the following manner. The motor 170 rotates clockwise, urging the belt 162 around the top set of rollers 176 on the tensioning apparatus 174, around the upstream rollers 168 of the end body 166A, across the conveyor bed 164, around the downstream rollers 168 of the opposing end body 166B, and back to the motor 170 as shown.

In certain implementations, the tensioning apparatus 174 can be used in a fashion similar to that described above with respect to tensioning apparatus 134. As shown in FIGS. 7E and 7F, the tensioning apparatus 174 is set in its operating or tensioned configuration with the handle 180 locked in its tensioned position on the right end of the handle slot 182 defined in the side 161B of the conveyor 160. In this configuration, the belt 162 is correctly tensioned to rotate around the conveyor 160 during operation. Further, the tensioning apparatus 174 also has an untensioned configuration similar to that described above with respect to tensioning apparatus 134 in which the handle 180 is moved to its untensioned position closer to the left end of the slot 182. In this configuration, the belt 162 is looser than in the tensioned configuration, thereby allowing for repairs and/or maintenance of the belt 162 and/or any other component of the conveyor 160.

The conveyor bed 164 in this exemplary embodiment has a scale 190 incorporated therein. As best shown in FIGS. 7E-7K, the scale 190 has a scale frame 192 having sides 194A, 194B, crossbars 196 that extend from one side 194A to the other side 194B across the width of the conveyor 160, and elongate frame rails 198 extending parallel to the sides 194A, 194B along the length of the conveyor 160 and disposed on and supported by the crossbars 196. Alternatively, the frame 192 can have any configuration of rails/crossbars and the like. The frame 192 is configured to be positioned in the bed 164 of the conveyor 160 such that the frame 192 becomes a part of the bed 164 as best shown in FIGS. 7G (in which the frame 192 is positioned within the bed 164) and 7H (in which the frame 192 has been removed from the conveyor 160.

As best shown in FIG. 7K, the frame 192 can have four scale load cells 200 disposed under and attached to the frame 192 as shown. According to one embodiment, the load cells are standard strain gauge load cells. In one specific example, the load cells 200 are RLPC6 Single-Point Load Cells, which are commercially available from Rice Lake Weighing Systems (www.ricelake.com). Alternatively, the load cells 200 can be any known load cells or other such mechanisms for use in a conveyor scale. The load cells 200 are attached to the frame 192 such that, when weight is applied to the frame 192, it is transferred to the load cells, which deform slightly and thereby can measure the weight being applied to the frame 192 via the product on the conveyor bed 164.

Because the product is moving across the conveyor bed 164 as a result of normal operation of the conveyor 160, the resulting scale reading (as captured in graph form) is a curve that increases as the product proceeds onto the frame 192, peaks as the entire product (or the heaviest part of the product) is disposed on the frame 192, and then tapers off as the product proceeds off of the frame 192. Exemplary curves of this nature are shown in FIGS. 19A and 20A-20D and discussed in further detail below.

In one exemplary embodiment, the analysis module 88 can analyze the captured sensor data from the load cells 200 (and the resulting curve as described above, whether captured graphically or solely numerically), the presence sensors 210, and/or the encoder (not shown) to calculate a weight of each product as it moves across the scale frame 192. Based at least in part on the product weight, analysis module 88 may then create a classification for the product. Based on the above determinations of the analysis module 88, the communication module 86 may control the sorting conveyor 34 or any other part of the overall system 10 based on the determination made by analysis module 88.

In addition, as best shown in FIG. 7L, the conveyor 160 can also have position or object presence sensors 210 disposed on opposing sides 161A, 161B of the conveyor 160 as shown to track the presence of each product as it is urged across the conveyor 160. These sensors 210 are coupled to the computing device 54 of the system 10 and can be used to track the exact position of each product on the conveyor 160.

Disposed over the conveyor 160 is an enclosure (also referred to herein as a hood) 162 that can contain an imaging device and other sensors to gather information about each product passing through the enclosure 162. According to various embodiments as best shown in FIGS. 8D and 8E, the hood 162 has a frame 220 that includes legs 222 and an elongate rail 224 extending along the length of the hood 162 at the top of the hood 162. Further, in this particular implementation, the frame 220 has four light bars 226 disposed under and attached to the elongate rail 224 as shown to illuminate each product as it passes over the conveyor 160. The hood 162 also has removable sidewalls 228 and endwalls 230 that can be disposed on the frame 220 to create a controlled internal environment with controlled lighting, etc. for ensuring that the environment is optimal for capturing images and collecting other information about each product as it passes through. As shown in FIGS. 8A and 8C, the endwalls 230 are disposed over only a portion of the ends of the hood 162, thereby creating an opening 232 on each end with sufficient clearance for any product on the conveyor 160 to pass therethrough. According to certain embodiments, the sidewalls 228 and endwalls 230 can be removed for easy access to the interior of the hood 162, including for cleaning, maintenance, or for additional configurability (such as adding a side camera, for example).

In addition, as best shown in FIG. 8D, according to certain embodiments, the hood 162 can also have a light diffuser 234 disposed within the hood 162 such that the diffuser 234 is disposed between the lights 226 and the conveyor 160 such that all the light emanating from the lights 226 must pass through the infuser 234 before hitting any product on the conveyor 160. This results in diffused, uniform light striking any products below. In one exemplary embodiment, the diffuser 234 is made of translucent plastic. More specifically, the diffuser 234 can be made of ultra high molecular weight polyethylene ("UHMW-PE"). Alternatively, the diffuser 234 can be made of any appropriate translucent material. Alternatively, instead of diffuser 234, each of the lights 226 can have a diffuser attached thereto or, in a further alternative, are lights that are configured to emit diffused light.

As best shown in FIGS. 8A-8E, a camera 238 is disposed above the diffuser 234 and attached to the elongate rail 224, and the diffuser 234 has an opening 240 defined therein that allows for the camera 238 to be able to capture images via the opening 240.

In one embodiment, the camera is a 3D camera. One specific example of a camera used in this classification device 32 is a RealSense Depth Camera D455 available from Intel Corp. (www.intelrealsense.com). Alternatively, the camera can be any known 3D camera for use in computer vision systems. In a further alternative, the camera can be a 3D scanner, an RGB camera, or any other known camera for use in such a system.

In the specific implementation as shown, the camera 238 is disposed within a camera enclosure 239. In some aspects, the enclosure 239 is a custom, food grade enclosure that can withstand sanitary washdown. Further, the camera 238 can also have a single board computer (not shown) coupled thereto that can be used to communicate with the computing device 54. In one specific embodiment, the single board computer can be a Raspberry Pi 4, which is commercially available from Raspberry Pi (www.raspberrypi.com).

Further, spatial references are provided for the camera system. More specifically, according to one embodiment as best shown in FIG. 7B, spatial target objects (in this case, balls) are provided on the sides of the conveyor 160 that can be used by the camera system to self-calibrate and self-align. Further, it can also allow for continuous color/white balancing using the same six reference points.

In addition, the camera 238 can operate better with a consistent background around each product as it passes over the conveyor 160. To that end, in accordance with certain implementations, both the conveyor belt 162 and the inner walls of the conveyor sides 161A, 161B can be the same color, which, in one specific example, is blue. Alternatively, the uniform background can have any uniform color.

As discussed above, the classification device 32 is used to collect relevant information about each product as it passes therethrough. Thus, the scale 190 discussed above collects weight information while the 3D camera collects images and other information that can be calculated or otherwise discerned from the images, including product type, product dimensions, etc. In accordance with certain implementations, the 3D camera is used in combination with a computer or machine vision system to gather the information.

In certain specific implementations in which the products are meat products, the classification system 32 can be configured to determine a product classification of meat products. Among other things, the product classification may include a "meat cut value," which identifies a meat cut type, a weight, and/or a dimension. The meat cut value may also identify a defective product, such as a leaking or damaged product (e.g., the seal around the meat may have broken). The product classification also may include a confidence value configured to indicate a likelihood a meat cut value is correct.

According to some embodiments, the classification system 32 can also have a belt encoder (not shown) configured to measure a belt speed or position of the conveyor 160. Those in the art may select sensors appropriate for the given system. In further embodiments, the sensor system may include photoelectric sensors (such as the sensors 210 discussed elsewhere herein) configured to detect products moving along the conveyor of the classification system 32.

According to some implementations, like the spacing conveyor 30, the classification device 32 is also modular, with the three different sections (the hood 162, the conveyor 160, and legs 164) being separable from each other as best shown in FIG. 6B. As with the conveyor 30, this can allow for the legs 164 to be adjusted/adjustable to modify the angle of the conveyor 160. In other words, the legs 164 can be adjusted or constructed such that the conveyor 160 is disposed in an incline (with products moving up vertically as they move across the conveyor 160). Alternatively, the legs 164 can be adjusted or constructed such that the conveyor 160 is disposed in a decline (with products moving downward as they move across the conveyor 160). In a further alternative, the conveyor 160 can be flat. Further, the modularity allows for the hood 162 to be removed and repaired or replaced with a different hood and/or different equipment within the hood 162. The modularity allows the various components of the conveyor 160 and/or the hood 162 to be updated without requiring replacement of the entire device 32 to implement the changes.

In operation, the computing device 54 according to any of the embodiments herein can gather information about a specific product from the presence detection sensors 210, the camera 238, the scale 190, and any other sensors or information collection equipment in the classification device 32. As described in further detail above, the analysis module 88 can analyze the captured sensor data and determine when to actuate the pushers 36 of the sort conveyor 34 to direct each product to an appropriate loading station 38 or other destination based on the classification of that product. Further, the communication module 86 can control the pushers 36 to sort the products as appropriate. Alternatively, the system 10 can operate in any known fashion to control the classify the products and control the sorting conveyor 34 and pushers 36 to ensure proper processing of products.

An alternative version of a conveyor system 250 is depicted in FIGS. 9A and 9B according to one alternative embodiment. In this implementation, the conveyor system 250 is gapping scale conveyor system that includes both a gapping conveyor 252 and a scale conveyor 254 disposed within the conveyor system 250, which has conveyor sides 251A, 251B. This gapping scale conveyor system 250 is configured to both space (or otherwise separate) and weigh products in the same system. More specifically, the gapping conveyor 252 separates, also known as gapping or spacing, products traveling along gapping conveyor 252 before transporting each product to the scale conveyor 254 to weigh each product. In one embodiment, the scale conveyor 254 can be configured to weigh each product without stopping when the product is positioned over a scale section of the scale conveyor 254. In further embodiments as will be described in further detail below, the products may be weighed on the scale conveyor 254 while also being imaged by a computer vision system. Further, weights measured by the scale may be used by an image acquisition and classification system as described elsewhere herein.

In illustrative embodiments as shown in FIGS. 9A and 9B, the belts 256, 258 of gapping and scale conveyors 252 and 254, respectively, are positioned with the same fixed slopes. These belts, in other embodiments, may be adjustable to be positioned at varying slopes. While the gapping conveyor 252 is illustrated to be shorter than the scale conveyor 254, it shall be appreciated that in other embodiments, both conveyors may be shorter or longer, or the gapping conveyor 252 may be longer than the scale conveyor 254. Further, in other implementations, the conveyor 252 may be detached from conveyor 254.

The computing device 54 can selectively activate the gapping conveyor 252 to move a product toward the scale conveyor 254 until the product is transferred to the scale conveyor 254. By selectively activating the gapping conveyor 252 or controlling the speed of the conveyor 252, the computing device creates a prescribed gap between products. More specifically, in certain implementations, the analysis module 88 can analyze the captured sensor data from the gapping (or "spacing") conveyor 252 to determine a specific location of each product as it moves onto the gapping conveyor 252. Based at least in part on the product location, analysis module 88 may then determine when to actuate the conveyor belt 256 such that the product is sufficiently spaced from the product ahead of it and the product behind it on the conveyor 30 as it is transferred to the scale conveyor 254. Based on the above determinations of the analysis module 88, the communication module 86 may control the gapping conveyor 252 to place the product in the proper position with the desired spacing in relation to the adjacent products based on the determination made by analysis module 88.

As discussed elsewhere herein, these gaps between the products facilitate image collection for classification, weight measurement of a single product, and sortation by the sorting conveyor and related mechanisms as discussed above.

As best shown in FIG. 9B, the scale conveyor 254 has a multi-zone scale including three scales 260A, 260B, 260C configured to measure a weight of a product traveling along the conveyor 254. Each scale 260A, 260B, 260C of the multi-zone scale is configured to measure the weight of a product or products positioned on the portion of the conveyor belt within the scale zone corresponding to the scale, the scale zone being the area on the conveyor belt 258 over the scale 260A, 260B, 260C.

As explained in more detail below, the multi-zone scale conveyor 254 enables the system to space the products relatively close together. As such, such a multi-zone scale conveyor 254 makes it possible to minimize the size of the system 250 and thereby makes it possible to fit the system 250 and the overall system 10 into smaller facility spaces than known technologies.

Alternatively, the scale conveyor 254 can have one, two, four, five, six, or any other number of scales.

FIG. 10 schematically shows uniform products 272A, 272B, 272C traveling along a conveyor belt 270 in a direction of travel represented by arrow A (thus, in this figure, from left to right). As the products 272A-C travel along the conveyor belt 270, there is a gap 274 between each adjacent product 272A-C. The products 272A-C are also separated by a pitch 276, which is the distance between one point on a first product (such as product 272A) and the same point on an adjacent product (such as product 272B). Thus, where the products 272A-C are uniform, separating products 272A-C according to a uniform pitch 276 will result in a uniform gap 274, and vice versa. In contrast, for non-uniform products 272A-C traveling along a conveyor belt 270, however, a uniform gap 274 will result in a variable pitch 276, and a uniform pitch 276 will result in a variable gap 274 (as shown in FIGS. 11A and 11B, which are discussed below).

In accordance with one implementation, a multi-scale conveyor such as conveyor 254 can accommodate variations in product size and orientations. More specifically, according to certain embodiments, the conveyor 254 can separate products according to a uniform gap, and thereby can have a reduced size in comparison to known devices. That is, as shown in FIG. 11A, a known conveyor system with an in-motion scale that is weighing non-uniform products 282 generally requires a broad fixed pitch 280 to ensure it can accommodate the largest product, thereby resulting in non-uniform gaps 284 requiring substantial length to the conveyor in order to do so. In contrast, in the instant embodiment as best shown in FIG. 11B, separation of products 290 via a uniform gap 292 enables the products to be placed closer together compared to spacing products according to a fixed pitch. Thus, having a fixed pitch (as in FIG. 11A) causes a larger gap 284 between small products 282 to ensure the large products are weighed one at a time. As a result, separating nonuniform products 290 according to a fixed gap 292 as shown in FIG. 11B requires less space on a conveyor belt compared to separating with a fixed pitch. In addition, FIG. 11B also illustrates how the orientation of the same products 290 can change the number of products 290 per length of belt. As the number of products 290 per length of belt decreases, the maximum capacity of the scale in products per minute decreases.

FIGS. 12A-12C depict a cross section of the scale conveyor 254 according to one embodiment receiving products 290 with a fixed gap 292 similar to the scenario depicted in FIG. 11B. According to certain implementations, the fixed gap 292 may be determined by the length of a scale zone 300A, 300B, 3000 (corresponding to scales 260A-C) in the direction of travel. For example, the length of the fixed gap may be equal to or greater than the length of each scale zone 300A-C. (In these embodiments, the conveyor belt 258 is configured to be flexible enough to transfer a weight of a product to a belt support below a top portion of the conveyor belt 258.)

In accordance with some implementations, the conveyor belt 258 of the scale conveyor 254 extends across two flat sections 302, 304—one on either side of the three scale beds 262A, 262B, 262C. The flat sections 302, 304, also known as the infeed belt support 302 (to receive products) and the discharge belt support 304 (to discharge products), are configured to allow a smooth transition onto and from the three scale beds 262A-C. Between the flat sections 302, 304, the conveyor belt 258 runs across the three scale beds 262A-C. In some embodiments, each scale bed 262A-C can span the width of the conveyor belt 258.

One exemplary scale assembly 310 is depicted in FIGS. 14A-14D, according to one embodiment. It is noted that the scale assembly 310 could represent any of the scales 260A-C discussed above with respect to conveyor 254. Alternatively, any other known scale assembly can be used. The assembly 310 has an upper frame 312 that includes a base 314 and the scale bed 316, which is made up of multiple rails 318 as shown. Further, the assembly 310 has a lower frame 320 that can be attached on each end to the conveyor sides 251A, 251B via attachment mechanisms such as nuts 322. In addition, the scale assembly 310 in this implementation has two load cells 324. According to one embodiment, these load cells 324 can be substantially similar or identical to the load cells 200 discussed above. In certain alternatives, the assembly 310 can have one, three, four, five, six, or any number of load cells 324. The number of load cells 324 in some embodiments can be determined by the width of the conveyor belt 258 or the scale load requirements.

In certain implementations as shown in FIGS. 15A-15C, the attachment nuts 322 described above can be scale leveling spacer nuts 322 configured to adjust an orientation of a scale assembly. More specifically, FIGS. 15A-15C depict an exemplary scale leveling space nut 322. In order to avoid an unintended load being applied to one of the scale beds 262A-C, the infeed and discharge belt supports 302, 304 are preferably flush with the scale beds 262A-C. Furthermore, in some exemplary embodiments, any gaps between the scale beds 262A-C are preferably less than the pitch of the belt 258. To achieve this, the conveyor 254 can have leveling spacer nuts 322 located at each corner of the lower frames 320 of the scale assembly 310 of each scale 260A-C. Each leveling spacer nut 322 includes an off-center core, effective to allow fine vertical adjustment in a sanitary environment.

One exemplary version of a scale conveyor 254 is depicted in FIGS. 16A-16C, according to one embodiment. The scale conveyor 254 of this implementation includes a body 330 configured to incorporate the three adjacent scales 260A-C as best shown in FIG. 16B. The scale conveyor 254 also includes a motor assembly 332 configured to rotate the conveyor belt 258. In other embodiments, the scale conveyor 254 may include more or fewer scales. The number of scales may be selected as a function of a product length for a given customer/use, such as a maximum length of a plurality of products. In a similar manner, the length of the scales may also be selected as a function of a product length for a given customer/use. For example, two or more scales may be virtually combined to achieve a plurality of virtual scale lengths. The virtual scale lengths may be dynamically changed from product to the next product in real time. It is noted that the scale conveyor 254 and the various components and features therein can be substantially similar to other conveyor embodiments disclosed or contemplated herein.

According to one embodiment as shown in FIG. 17, the scale conveyor 254 can also have sensors similar to those described in other embodiments herein. For example, among others, the sensors may include an imaging device 340 similar or identical to any of the other imaging device embodiments discussed or contemplated herein. Further, the conveyor 254 can also have a belt encoder (not shown) and/or a photoelectric sensor (not shown) configured to output measurements corresponding to a length of a product.

Other sensors are also contemplated. For example, sensor measurements could be used to determine the difference between a leading edge and a trailing edge of a product. Measurements from one or more sensors may also be used to determine the position or an orientation of a product on the scale conveyor 254.

In use as shown in FIGS. 18A and 18B, a product can be moved through the scale zones 300A-C of the exemplary scale conveyor 254. Products smaller than the overall length of the scaling area, i.e., all the scale zones 300A-C, can be weighed multiple times by the three scales 260A-C, thereby increasing accuracy of the weight measurement. For example, the illustrated product is shorter than two zones of the three zone 300A-C scale. The product may be measured while it is positioned in zones 1 and 2, and then measured again while the product is positioned in zones 2 and 3. The measurements may be averaged or compared so as to reduce noise and increase weight accuracy. More specifically, in one embodiment, the analysis module 88 can analyze the captured sensor data from the load cells 324 of each scale 260A-C (and the resulting curve as described below, whether captured graphically or solely numerically) and any other relevant sensors relating to the multiple measurements taken over time to calculate a weight of each product as it moves across the scale frame 192. Based at least in part on the product weight, analysis module 88 may then create a classification for the product. Based on the above determinations of the analysis module 88, the communication module 86 may control the sorting conveyor 34 or any other part of the overall system 10 based on the determination made by analysis module 88.

In one specific example as shown in FIGS. 19A and 19B according to one embodiment, a graph is depicted in FIG. 19A illustrating measurements taken over time within the scale zones 300A-C as shown in FIG. 19B as one product 350 moves along the exemplary scale conveyor 254. The dotted box 352 indicates one portion of the measurements that may be summed and averaged (such as by the analysis module 88) in order to obtain a weight. As the product 350 moves through each zone 300A-C, the measurement increases as more of the product 350 is positioned in the zone. The measurement then decreases as the product 350 moves out of the zones 300A-C. It shall be appreciated that the weight curves for each zone 300A-C are time shifted.

FIGS. 20A-20D, according to another exemplary embodiment, show a plurality of graphs, each illustrating a set of weight curve sections that could be combined, compared, averaged, or filtered (such as by the analysis module 88) to determine a more stable weight reading. In some embodiments, the computing device 54, and particularly the analysis module 88, may determine multiple weight readings of the same product using different sets of weight curve sections. The computing device 54 and analysis module 88 may then average the multiple weight readings, and/or remove outliers (i.e. a minimum or maximum value) to determine a weight of the product. In some embodiments, scale zone measurements may be analyzed by the computing device 54 to diagnose malfunctions in one or more of the scales. The multiple zones can also assist in continuous scale zeroing.

It should be noted that various embodiments may apply to a wide variety of products, such as meat products. Among others, those meat products may derive from a number of organic sources, such as cows, pigs, poultry (e.g., turkey, chicken), deer, fish, etc. Alternatively, the embodiments herein can be used with any other products that require processing.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

While the various systems described above are separate implementations, any of the individual components, mechanisms, or devices, and related features and functionality, within the various system embodiments described in detail above can be incorporated into any of the other system embodiments herein.

The terms "about" and "substantially," as used herein, refers to variation that can occur (including in numerical quantity or structure), for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The terms "about" and "substantially" also encompass these variations. The term "about" and "substantially" can include any variation of 5% or 10%, or any amount—including any integer—between 0% and 10%. Further, whether or not modified by the term "about" or "substantially," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A gapping in-motion scale conveyor system for a plurality of products, the system comprising:
   (a) a gapping conveyor;
   (b) a multi-zone scale conveyor; and
   (c) a control system configured to selectively activate the gapping conveyor to move the plurality of products, in series, toward the scale conveyor,
   wherein the control system is configured to move the plurality of products onto the scale conveyor to form substantially the same gap between each of the products in a series of three or more products traversing the scale conveyor, and
   wherein the control system is configured to determine the location of product relative to each scale zone.

2. The gapping in-motion scale conveyor system of claim 1, wherein the scale conveyor includes a plurality of scale zones that can be virtually combined to achieve a plurality of virtual scales lengths that can be dynamically changed from product to the next product in real time.

3. The gapping in-motion scale conveyor system of claim 2, wherein the control system is configured to receive a set of measurements from the plurality of scale zones corresponding to an instant where a first product and a second product are traveling through the plurality of scale zones.

4. The gapping in-motion scale conveyor system of claim 3, wherein the control system is configured to determine a weight of the first product using the set of measurements.

5. The gapping in-motion scale conveyor system of claim 1, wherein the control system is configured to separate a plurality of products by selectively activating the gapping conveyor or controlling the speed of the gapping conveyor.

6. The gapping in-motion scale conveyor system of claim 1, wherein the scale conveyor and the gapping conveyor are configured to elevate a plurality of products traveling along a belt of the gapping conveyor and a belt of the scale conveyor.

7. The gapping in-motion scale conveyor system of claim 1, comprising a sensor, wherein the control system is configured to determine a length of a product using the sensor.

8. A conveyor system for a plurality of products, the system comprising:
   (a) a gapping conveyor comprising three conveyor sections;
   (b) a classification device disposed adjacent to and coupled with the gapping conveyor, the classification device comprising:
      (i) a conveyor comprising a scale disposed within the conveyor; and
      (ii) a sensor enclosure disposed over the conveyor, the sensor enclosure comprising an imaging device; and
   (c) at least one processor configured to:
      (i) control one or more sensors to capture sensor data regarding the product as the product moves along the gapping conveyor;
      (ii) determine, based at least in part on the sensor data, a position of the product in relation to adjacent products;
      (iii) select, based at least in part on the position of the product, a desired gap between the product and the adjacent products;
      (iv) control the three conveyor sections to create the desired gap between the product and the adjacent products;
      (v) control one or more sensors and the imaging device to capture sensor data regarding the product as the product moves through the classification;
      (vi) determine, based at least in part on the sensor data, a classification of the product;
      (vii) select, based at least in part on the classification of the product, a desired action relating to the product; and
      (viii) control any component of a corresponding processing system to perform the desired action relating to the product.

9. The conveyor system of claim 8, wherein the conveyor comprising the scale comprises a plurality of scale zones that can be virtually combined to achieve a plurality of virtual scales lengths that can be dynamically changed from the product to one of the adjacent products in real time.

10. The conveyor system of claim 9, wherein the control system is configured to receive a set of measurements from the plurality of scale zones corresponding to an instant where the product and one of the adjacent products are traveling through the plurality of scale zones.

11. The conveyor system of claim 10, wherein the control system is configured to determine a weight of the product using the set of measurements.

12. The conveyor system of claim 8, wherein the control system is configured to control the three conveyor sections to create the desired gap by selectively activating the three conveyor sections or controlling the speeds of the three conveyor sections.

13. The conveyor system of claim 8, wherein the scale conveyor and the gapping conveyor are configured to elevate the product and the adjacent products traveling along belts of the three conveyor sections and a belt of the conveyor comprising the scale.

14. The conveyor system of claim 8, wherein the control system is configured to determine a length of the product using one or more sensors.

15. A conveyor system for a plurality of products, the system comprising:

(a) a gapping conveyor;

(b) a scale conveyor comprising at least two scale zones; and (c) a control system configured to selectively activate the gapping conveyor to move the plurality of products, in series, toward the scale conveyor, wherein the control system is configured to move the plurality of products onto the scale conveyor to form substantially the same gap between each of the plurality of products in a series of three or more products traversing the scale conveyor, and wherein the control system is configured to receive a set of measurements from the at least two scale zones corresponding to an instant where a first product and a second product of the plurality of products are traveling through the at least two scale zones.

16. The conveyor system of claim 15, wherein the control system is configured to determine the location of the first product relative to the at least two scale zones.

17. The conveyor system of claim 15, wherein the at least two scale zones can be virtually combined to achieve a plurality of virtual scale lengths that can be dynamically changed from the first product to the second product in real time.

18. The conveyor system of claim 15, wherein the control system is configured to determine a weight of the first product using the set of measurements.

19. The conveyor system of claim 15, wherein the control system is configured to form substantially the same gap between each of the plurality of products by selectively activating the gapping conveyor or controlling the speed of the gapping conveyor.

20. The conveyor system of claim 15, wherein the control system is configured to determine a length of the first product using a sensor.

* * * * *